US009665398B2

(12) United States Patent
Magee et al.

(10) Patent No.: US 9,665,398 B2
(45) Date of Patent: May 30, 2017

(54) METHOD AND APPARATUS FOR ACTIVITY BASED EXECUTION SCHEDULING

(71) Applicant: Apple Inc., Cupertino, CA (US)

(72) Inventors: James Michael Magee, Orlando, FL (US); Russell A. Blaine, San Carlos, CA (US); Daniel Allen Chimene, San Francisco, CA (US); Vishal Patel, Sunnyvale, CA (US); Shantonu Sen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/576,963

(22) Filed: Dec. 19, 2014

(65) Prior Publication Data

US 2015/0347178 A1 Dec. 3, 2015

Related U.S. Application Data

(60) Provisional application No. 62/005,931, filed on May 30, 2014.

(51) Int. Cl.
*G06F 9/46* (2006.01)
*G06F 9/48* (2006.01)
*G06F 9/52* (2006.01)

(52) U.S. Cl.
CPC ............. *G06F 9/4881* (2013.01); *G06F 9/52* (2013.01)

(58) Field of Classification Search
CPC .................. G06F 9/4881; G06F 9/52

(Continued)

(56) References Cited

U.S. PATENT DOCUMENTS 5,692,193 A * 11/1997 Jagannathan ........... G06F 8/451
711/6
5,745,778 A * 4/1998 Alfieri ................... G06F 9/5088
711/133

(Continued)

FOREIGN PATENT DOCUMENTS

WO WO-01/06365 1/2001
WO WO-2008/155165 12/2008

(Continued)

OTHER PUBLICATIONS

"HP-UX 10.0 Process Management White Paper", *HP-UX Release 10.0, HP 9000 Series 700/800 Computers*, http://www.pimpworks.org/hp/relnotes/proc_mgt.txt, (Jan. 1995), 22 pages.

(Continued)

*Primary Examiner* — Phillip H Nguyen
(74) *Attorney, Agent, or Firm* — Blakely, Sokoloff, Taylor & Zafman LLP

(57) ABSTRACT

A method and an apparatus for activity based execution scheduling are described. Activities may be tracked among a plurality of threads belonging to a plurality of processes running in one or more processors. Each thread may be associated with one of the activities. Each activity may be associated with one or more of the threads in one or more of the processes for a data processing task. The activities may be ordered by a priority order. A group of the threads may be identified to be associated with a particular one of the activities with highest priority based on the priority order. A thread may be selected from the identified threads for next scheduled execution in the processors.

16 Claims, 18 Drawing Sheets

(58) Field of Classification Search
USPC .................................... 718/103, 102, 104
See application file for complete search history.

(56) References Cited

U.S. PATENT DOCUMENTS

| | | | | |
|---|---|---|---|---|
| 5,961,584 | A * | 10/1999 | Wolf | G06F 9/542 718/100 |
| 6,148,338 | A | 11/2000 | Lachelt et al. | |
| 6,185,652 | B1 * | 2/2001 | Shek | G06F 13/24 710/263 |
| 6,223,207 | B1 * | 4/2001 | Lucovsky | G06F 9/52 710/52 |
| 6,865,734 | B2 * | 3/2005 | Holzle | G06F 8/4441 717/139 |
| 7,086,056 | B2 | 8/2006 | Fukushima | |
| 7,306,219 | B2 | 12/2007 | Keil et al. | |
| 7,412,611 | B2 | 8/2008 | Tipley | |
| 7,770,212 | B2 | 8/2010 | Le Saint | |
| 7,802,255 | B2 * | 9/2010 | Pilkington | G06F 9/3851 712/216 |
| 7,853,814 | B2 | 12/2010 | Oyanagi | |
| 7,895,605 | B2 | 2/2011 | Goswami et al. | |
| 8,069,374 | B2 | 11/2011 | Panigrahy et al. | |
| 8,301,924 | B2 | 10/2012 | Kim et al. | |
| 8,442,960 | B1 | 5/2013 | Meyer et al. | |
| 8,566,828 | B2 * | 10/2013 | Pilkington | G06F 9/4843 718/102 |
| 8,621,608 | B2 | 12/2013 | Dalcher | |
| 8,656,145 | B2 * | 2/2014 | Plondke | G06F 9/4818 712/244 |
| 2002/0065953 | A1 * | 5/2002 | Alford | G06F 9/4881 719/328 |
| 2002/0178208 | A1 * | 11/2002 | Hutchison | G06F 9/52 718/102 |
| 2003/0182464 | A1 * | 9/2003 | Hamilton | G06F 9/546 719/314 |
| 2004/0002974 | A1 * | 1/2004 | Kravitz | G06F 9/52 |
| 2005/0102458 | A1 * | 5/2005 | Ober | G06F 9/462 710/260 |
| 2005/0149936 | A1 * | 7/2005 | Pilkington | G06F 9/3851 718/102 |
| 2005/0206920 | A1 * | 9/2005 | Yamazaki | G06K 15/02 358/1.8 |
| 2006/0136919 | A1 * | 6/2006 | Aingaran | G06F 9/3009 718/100 |
| 2007/0055839 | A1 * | 3/2007 | Hanes | G06F 9/3851 711/165 |
| 2007/0094664 | A1 * | 4/2007 | So | G06F 9/485 718/103 |
| 2007/0150657 | A1 * | 6/2007 | Yigzaw | G06F 12/0842 711/128 |
| 2008/0005736 | A1 | 1/2008 | Apacible et al. | |
| 2008/0148155 | A1 | 6/2008 | Kogan et al. | |
| 2009/0044189 | A1 * | 2/2009 | Mutlu | G06F 9/4881 718/102 |
| 2009/0094624 | A1 | 4/2009 | Craft et al. | |
| 2011/0314457 | A1 * | 12/2011 | Schaude | G06F 9/4423 717/139 |
| 2012/0110586 | A1 * | 5/2012 | Coon | G06F 9/4881 718/102 |
| 2012/0210071 | A1 * | 8/2012 | Black | G06F 15/167 711/130 |
| 2013/0014037 | A1 * | 1/2013 | Fisher | G06F 9/542 715/760 |
| 2015/0135183 | A1 * | 5/2015 | Kipp | G06F 9/46 718/103 |
| 2015/0143378 | A1 * | 5/2015 | Lee | G06F 9/5027 718/103 |

FOREIGN PATENT DOCUMENTS

| | | |
|---|---|---|
| WO | WO-2013/048943 | 4/2013 |
| WO | WO-2013/184390 | 12/2013 |

OTHER PUBLICATIONS

Bardram, Jakob E., "Activity-based computing: support for mobility and collaboration in ubiquitous computing", *Pers Ubiquit Comput*, vol. 9, Springer-Verlag London Limited, (Jan. 28, 2005), pp. 312-322.

Benini, et al., "Policy Optimization for Dynamic Power Management", *IEEE Transactions on Computer-Aided Design of Integrated Circuits and Systems*, vol. 18, No. 6, (Jun. 1999), pp. 813-833.

Eyers, David M., "Active privilege management for distributed access control systems", *University of Cambridge, King's College*, Technical Report No. 669, UCAM-CL-TR-669, ISSN 1476-2986, (Jun. 2006), 222 pages.

Zheng, et al., "SWAP: A Scheduler With Automatic Process Dependency Detection", *Proceedings of the First Symposium on Networked Systems Design and Implementation (NSDI)*, (2004), 14 pages.

* cited by examiner

300

Running a plurality of processes including a first process and a second process, each process having attributes including a privilege to control access of the process to processing resources, wherein the first process is running with a first privilege prohibited from access to a processing resource, wherein the second process is running with a second privilege allowed to access the processing resource 301

Dynamically transferring the second privilege to the first process in response to receiving a request from the second process at the first process to perform a data processing task for the second process, the second privilege to allow the first process to access the processing resource for the data processing task 303

Performing the data processing task for the second process via the first process running with the updated attributes including the second privilege 305

Running a plurality of processes, each process having attributes including an activity attribute to dynamically identify one of a plurality of activities associated with operations the process is currently performing 401A

↓

Tracking resource usage for operations performed by at least one of the processes for a particular one of the activities identified by a particular identifier via the activity attribute, the at least one of the processes including a first process and a second process, the first process performing operations for the particular activity 403A

↓

In response to receiving a request from the first process at the second process, dynamically updating the activity attribute of the second process with the particular identifier to perform operations for the first process, the operations performed by the first process for the particular activity accounting for a first amount of the resource usage, the operations performed by the second process with the activity identifier accounting for a second amount of the resource usage 405A

↓

Generating a report of the resource usage for the particular activity based on the particular identifier, wherein the report indicates the first amount and the second amount of the resource usage 407A

Generating a voucher for a first process running with a first privilege, the voucher indicating the first priority of the first process, wherein a second process is running with a second privilege, the second process configured to perform a data processing task 701

In response to receiving the voucher from the second process for performing the data processing task for the first process, granting the second process with the first priority to perform the data processing task according to the voucher of the first process 703

Resetting the second process back to the second priority subsequent to the data processing task for the first process 705

Tracking activities among a plurality of threads belonging to a plurality of processes running via one or more processors, each thread associated with one of the    activities, each activity associated with one or more of the threads in one or more of the processes for a data processing task, the activities having a priority order 1001

Identifying a group of the threads associated with a particular one of the activities with highest priority based on the priority order 1003

Selecting a thread from the group of threads identified for next scheduled execution in the processors 1005

Executing the selected thread for next execution in the processors 1007

| Tracking one or more activities for satisfying a blocking condition, wherein execution of a thread is halted waiting for satisfaction of the blocking condition and wherein the blocking condition is to be satisfied via execution of threads of one of the activities 1101 |

| Executing executable code associated with the threads of the one activity via the one thread until the blocking condition is satisfied 1103 |

| Resuming the execution of the executable code associated with the one thread subsequent to the satisfaction of the blocking condition 1105 |

```
┌─────────────────────────────────────────────────────────────────────────────────┐
│ Maintaining a power assertion indicator for a device component having a power    │
│ level, the power assert indicator indicating whether the power level of the      │
│ device component is allowed to be lowered 1301                                   │
└─────────────────────────────────────────────────────────────────────────────────┘
                                        │
                                        ▼
┌─────────────────────────────────────────────────────────────────────────────────┐
│ Sending a power assertion request from a first process for a data processing     │
│ task to prevent lowering the power level of the device component before the      │
│ data processing task is completed 1303                                           │
└─────────────────────────────────────────────────────────────────────────────────┘
                                        │
                                        ▼
┌─────────────────────────────────────────────────────────────────────────────────┐
│ Receiving a request at a second process from the first process for the second    │
│ process to perform operations for the data processing task, wherein the power    │
│ level of the device component is not allowed to be lowered before the            │
│ operations are completed via the second process 1305                             │
└─────────────────────────────────────────────────────────────────────────────────┘
                                        │
                                        ▼
┌─────────────────────────────────────────────────────────────────────────────────┐
│ Lowering the power level of the device component after the data processing       │
│ task is completed 1307                                                           │
└─────────────────────────────────────────────────────────────────────────────────┘
```

Maintaining a power assertion status for a device component having a power level, the power assert status indicating whether to allow the power level of the device component to be lowered 1401

Generating a voucher for a first process to indicate an outstanding request to prevent the power level of the device component from being lowered 1403

Updating, in response to receiving the voucher from a second process, the power assertion status of the device component to indicate an additional outstanding request to prevent the power level of the device component from being lowered 1405

Lowering, subsequent to the outstanding request and the additional outstanding request, the power level of the device component when the power assertion status indicates that there is no outstanding request to prevent the power level of the device component from being lowered 1407

Fig. 14

METHOD AND APPARATUS FOR ACTIVITY BASED EXECUTION SCHEDULING

CROSS-REFERENCE TO RELATED APPLICATIONS

This application is related to, and claims the benefits of, U.S. Provisional Patent Application No. 62/005,931, filed on May 30, 2014, entitled "METHOD AND APPARATUS FOR ACTIVITY BASED EXECUTION SCHEDULING", James Magee et al. which is hereby incorporated by reference herein in its entirety.

The present U.S. Patent application is related to the following U.S. Patent applications, each of which is incorporated herein by reference to the extent they are consistent with this disclosure:

(1) Application No. 62/005,935, filed May 30, 2014, entitled "ACTIVITY TRACING DIAGNOSTIC SYSTEMS AND METHODS;"
(2) Application No. 62/005,927, filed May 30, 2014, entitled "METHOD AND APPARATUS FOR INTER PROCESS PRIVILEGE TRANSFER;"
(3) Application No. 62/005,929, filed May 30, 2014, entitled "METHOD AND APPARATUS FOR INTER PROCESS PRIORITY DONATION;" and
(4) Application No. 62/005,921, filed May 30, 2014, entitled "METHOD AND APPARATUS FOR DISTRIBUTED POWER ASSERTION."

FIELD OF INVENTION

The present invention relates generally to managing thread executions in an operating environment. More particularly, this invention relates to an activity based thread execution in an operating environment.

BACKGROUND

Data structures describing states and resource ownership of processes are typically maintained in an operating environment or operating system (OS) to enable controls over these processes. Typically, the data structure representing a process is centrally managed via the OS to characterize how the process is running. For example, the OS may assign certain security levels and/or priority settings to a process via the data structure according to certain registered information of a user account, authorization credentials or other applicable configurations.

For example, the OS can assign a security (or authorization) level to a process. Multiple processes working cooperatively with each other to perform a task may have to run with different levels of privilege independent of the task. As a result, certain services running as daemon processes may be assigned as uber processes with a high level of authorization capability to accommodate requests for a wide variety of applications or processes. When hijacked, these uber processes may pose security risks for the system.

Capability based security models in OS have been implemented to improve system securities, such as Hydra from Carnegie Mellon University and Capsicum in FreeBSD operating system. Hydra was a microkernel based on IPC (inter process communication) ports and messaging with a mechanism for passing a single un-spoofable capability along with each message. However, the capabilities in Hydra were specific to the task being requested during an IPC and user code had to provide the specific capability needed for a given operation. There is no concept of adoption in a Hydra based system. Hydra or other true capability based systems have to pass specific capabilities to authorize each request independently.

Capsicum provides finer-grained capabilities and sandboxes into the FreeBSD operating system. However, the capabilities in Capsicum are represented as finer-grained access controlled file descriptors. In Capsicum, "angel" processes are used to create file descriptors that a first process is otherwise not allowed to access and pass them back via IPC to the first process. There is no concept of passing around a data structure to be adopted to alter future authorizations in Capsicum.

Further, execution priorities pre-assigned for multiple processes interacting with each other to accomplish a task may not be consistent with an intended importance of the task. It is common to run more than one process together to complete an action requested by an interactive user who may expect a snappy response for the action regardless how many different processes of various priorities are involved. However, executing processes based on pre-assigned priorities may result in delayed responses to the user as processes with high priorities but not related to the action may have more likelihood to be scheduled for processor cycle time.

Furthermore, when detecting a thread execution is blocked, an OS runtime may raise execution priority of certain processes (e.g. daemons) randomly to passively wait for a resolution to execute the blocked thread. Typically, threads of a whole process may have their priorities raised together regardless what operations or tasks each thread is executing. Often times, threads working on unimportant tasks may get priority for execution when execution conflicts occur. As a result, responsiveness of the overall system performance may be adversely affected.

Furthermore, a process may request a power assertion to prevent a system from going to a sleep state when certain operations are performed. Subsequently, the process can issue a release to remove the power assertion. However, tracking down when these operations are completed to issue the release may be difficult. For example, the operations may fan out to multiple processes or daemons running asynchronously to add a significant complexity in managing the power assertion requests. As a result, the system may enter a sleep state unexpectedly and/or remain in a high power state unintendedly.

Thus, existing mechanisms in process or task management of an operating environment tend to be statically constrained, inefficient and ineffective to dynamically distribute characteristics of processes between each other.

SUMMARY OF THE DESCRIPTION

A voucher may be containers for attributes and values used to pass context through an operating system or environment via inter process communication (IPC) mechanisms. Vouchers can be created, destroyed, redeemed and adopted. Messages carrying vouchers may be exchanged among separate processes or other runtime execution instances to distribute context information of the processes.

In one embodiment, a plurality of processes may be running with each process having attributes including a privilege to control access to processing resources. A first process may be running with a first privilege prohibited from access to a processing resource. A second process may be running with a second privilege allowed to access the processing resource. The first process may receive a request from the second process to perform a data processing task for the second process. In response, the second privilege may be dynamically transferred to the first process to allow the first process to access the processing resource. The first process may perform operations for the data processing task with the second privilege transferred from the second process.

In another embodiment, a first process running with a first priority may receive a request from a second process running with a second priority to perform a data processing task for the second process. A dependency relationship may be identified between the first process and a third process running with a third priority performing a separate data processing task. The dependency relationship may indicate that the data processing task is to be performed via the first process subsequent to completion of the separate data processing task via the third process. The third process may be updated with the second priority to complete the separate data processing task. The first process may perform the data processing task with the second priority for the second process.

In another embodiment, activities may be tracked among a plurality of threads belonging to a plurality of processes running in one or more processors. Each thread may be associated with one or more the activities. Each activity may be associated with one or more of the threads in one or more of the processes for a data processing task. The activities may be ordered by a priority order. A group of the threads may be identified to be associated with a particular one of the activities with highest priority based on the priority order. A thread may be selected from the identified threads for next scheduled execution in the processors.

In another embodiment, a power assertion indicator may be maintained for a device component having a power level. The power assertion indicator can indicate whether the power level of the device component is allowed to be lowered. A power assertion request may be sent from a first process to prevent lowering the power level of the device component before a data processing task is completed. A second process can receive a request from the first process to perform operations for the data processing task. The power level of the device component may not be allowed to be lowered before the second process completes the operations for the data processing task. The power level of the device component may be lowered after the data processing task is completed.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 3 is a flow diagram illustrating one embodiment of a process to dynamically transfer security privileges from one process to another process;

FIG. 4A is a flow diagram illustrating one embodiment of a process for tracking resource accounting using vouchers;

FIG. 7 is a flow diagram illustrating one embodiment of a process to generate a voucher for donating execution priority from one task to another task;

FIG. 10 is a flow diagram illustrating one embodiment of a process to schedule threads of a common activity as a group together according to vouchers;

FIG. 11 is a flow diagram illustrating one embodiment of a process to track activities of threads to resolve blocking conditions;

FIG. 13 is a flow diagram illustrating one embodiment of a process to maintain a power level of a device before a data processing task is completed;

FIG. 14 is a flow diagram illustrating one embodiment of a process to generate a voucher to pass a power assertion request between separate processes performing a common data processing task to maintain a power level of a device;

DETAILED DESCRIPTION

Figure 1:
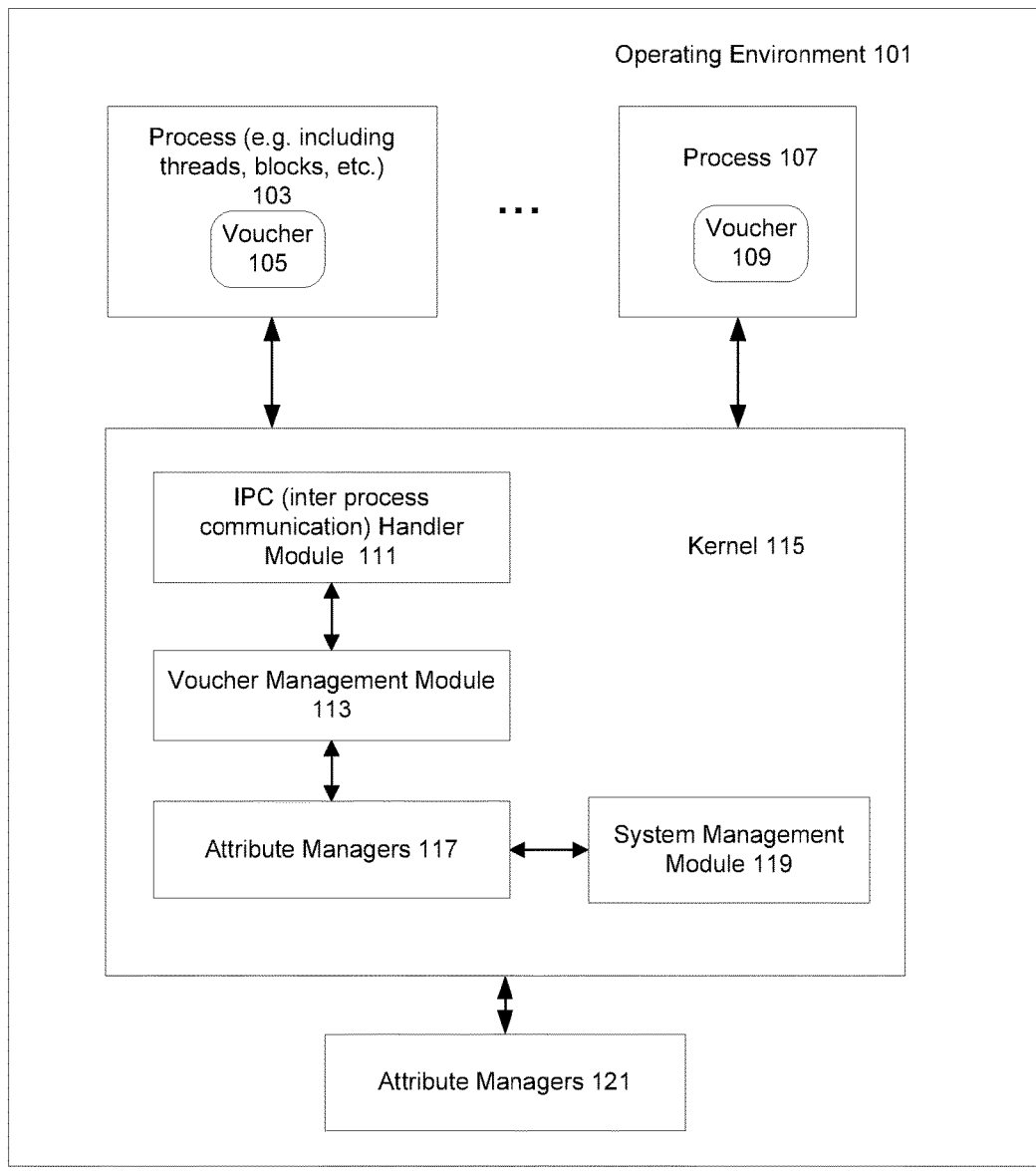
FIG. 1 is a block diagram illustrating one embodiment of a system with a voucher mechanism to pass task attributes among different processes.

Methods and apparatuses for activity based execution scheduling are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

A voucher may provide a container to represent a portion of a context of a runtime process. A context of a process may include attributes related to a runtime state of the process. In one embodiment, a voucher may include attribute/value pairs. Each attribute (and associated value) may be managed via an attribute manager which can be predetermined and/or dynamically configured in a kernel of an operating system. Examples of attributes may be related to runtime privilege, execution priority, power management, usage accounting, activity tracking, task scheduling, or other applicable management attributes on runtime operations.

A voucher may represent an assembled collection of meta-attributes rather than a direct capability for authorizing a specific single operation. For example, vouchers may be used as meta-data or additional data to allow various attributes (of processes or execution instances) to be used simultaneously in their capabilities for implicit activity tracking, importance representation, resource accounting, etc. Even in the security based voucher attributes, a voucher carries meta-data to be used in combination with or in addition to per task/thread data already available for such authorization. For example, a voucher may carry a security attribute or entitlement to alter the behavior of a sandbox authorization.

A context for an execution instance, such as a process, thread, etc. may include a set of data used by this instance at a point in time. A process may be a user application, a daemon running in the background, or a system application, etc. The context, when saved, can allow a continuation of this instance at an arbitrary future date. For example, a context may include states or statuses of processor registers, memory used, control registers used by an operating system to manage the execution instance, and/or other applicable data.

Applications (e.g. processes) can pass around attributes of runtime contexts via vouchers or a voucher mechanism for other processes to take on different identities or context attributes to perform operations as requested. A process can send/receive vouchers carrying context attributes, e.g. via IPC mechanism or messages.

In one embodiment, interfaces provided via a kernel may allow a process to access vouchers, for example, to create, destroy, redeem or adopt the vouchers. The process can redeem a received voucher to ask the kernel to update the process's own context according to attributes in the received voucher. The kernel may return a voucher back to the requested process in response to the redeem request. The returned voucher can be an altered/modified voucher with respect to an original voucher. A voucher may not be modified once returned. A thread within the process may "adopt" the received and redeemed voucher by communicating with the voucher system to request the adoption. The voucher system can then associate that voucher with the future execution of that thread.

A voucher system can create vouchers to provide a transporting mechanism to distribute attributes of a process context. The voucher system can reside, for example, in a kernel of an operating system. In one embodiment, the voucher system can include verification or certification operations to ensure that processes pass vouchers created by the voucher system. For example, the voucher system may be privileged to retrieve attribute values and/or determine validity of attribute values associated with a voucher. Such privilege may not be granted for processes or applications other than the voucher system. The voucher system may create vouchers which are immutable without the possibility of making changes (e.g. altering attributes/values) to an existing voucher. The voucher system may allow another voucher to be created using an existing voucher (e.g. via overlaying with additional attributes).

In some embodiments, an IPC message may include a reference to a voucher for processes to pass the voucher. A voucher system can manage the reference to the voucher without a need for an application to track whether there are still existing references to the voucher. The voucher system may automatically increment/decrement the reference count to the voucher as the voucher is being passed around. The voucher system can destroy a voucher, for example, when an associated reference count indicates that the voucher is no longer referenced.

Each attribute in a voucher may be managed via an attribute manager residing either in a kernel or a user space of an operating system. The voucher system may include a registry specifying which attribute managers have already been registered (e.g. predetermined). Multiple attribute managers may be pre-registered or dynamically updated with the voucher system. Examples of attribute managers may be related to security/privilege settings, activity tracing, changes in execution priority, execution scheduling, power management, and/or other application context attributes.

For example, a voucher can include an activity attribute managed by an activity manager to provide an inexpensive activity tracking mechanism. Operations incurred directly or indirectly via multiple processes or threads as a result of an activity (e.g. a user interface or network event etc.) can be identified via the voucher system.

An activity may correspond to a set of instructions, specifications or operations configured to be carried out by one or more threads across one or more processes executing one or more programs (or executables) asynchronously, simultaneously or in sequence when the activity is triggered. For example, an activity may be configured (e.g. via a script code, a setting, an executable or other applicable mechanism) to initiate execution (e.g. calling) a set of services and/or executables (programs) asynchronously or synchronously, in parallel or in sequence, when a corresponding triggering event is detected.

In another embodiment, a voucher can include an accounting attribute managed by a resource accounting manager to track the amount of resource usage to perform a task (e.g. sending an email). Each task can cause executions in multiple processes, daemons or other execution instances. The resource accounting manager may create a linkage among different processes (e.g. a network daemon, a user interface manager etc.) performing operations for a common task based on an account attribute value for monitoring the resource usage.

Resource accounting can charge the use of CPU (central processing unit) or processor cycles by daemons (e.g. a data indexing service daemon) to an application that caused the daemon to do the work by using vouchers to track who caused the daemon to do the work. Hence, a utility activity monitor can show, for example, processor cycle time consumed by a data indexing service daemon gets charged to different applications, such as email application, document processing application, etc. Resource accounting can also extend beyond daemons.

As an example, a business email account and a personal email account of an email application may be tracked as two separate tasks via different accounting attribute values. A resource accounting attribute in a voucher may allow a resource manager in an operating system to tally separate usages of processor cycles for the personal email account vs. the business email account without a need to require two separate email applications.

In one embodiment, entitlements may be special privileges that can be transferred via vouchers. For example, entitlements may include a cryptographically validated set of meta-privileges associated with an application or daemon. They may be queried by the sandboxing mechanism(s) of the system to determine access to certain sandbox escapes. Entitlements may be "live" referenced in the voucher system. A crypto failure of the main application would render the entitlement reference held in the voucher ineffective (just as it does for the originating process) at any time during a (e.g. complex) IPC work transfer down through as many daemons as required.

In some embodiments, roles may include means of identifying a mode of operation of an application. For instance, a role may indicate that a process has been authorized to access work-related items (such as contacts, emails, messages, VPNs (virtual private network), etc. . . . ) stored on a mobile device, where another role may limit the very same application to personal items only. We envision carrying these "roles" in vouchers as well, identifying the mode that subsequent daemons can execute in while servicing requests from a client in a particular mode. Just as with entitlements, a switch of mode for the application while a request is in flight may be seen through the voucher reference and the daemons working on their behalf will adjust accordingly on the fly.

FIG. 1 is a block diagram illustrating one embodiment of a system with a voucher mechanism to pass task attributes among different processes. In one embodiment, system 100 may include operating environment 101, such as an operating system hosting execution instances including processes 103, 107, kernel 115, attribute managers 121 etc., via one or more processors. Each process may include threads, blocks or other instruction sequences.

Kernel 115 may include inter process communication handler module 111 to provide interfaces or methods for the exchange of data among multiple threads in one or more processes. Inter process communication may be based on shared memory, system calls, application programming interface (API) or other applicable mechanism. For example, process 103 may communicate with process 107 by sending IPC messages via IPC handler module 111. Voucher management module 113 may be a subsystem in kernel 115. Voucher management module 113 may include a daemon exposed via IPC operations (e.g. IPC messages). In one embodiment, vouchers of system 100, such as vouchers 105, 109, may be maintained and managed in a single subsystem via voucher management module 113.

For example, vouchers can be created, destroyed, referenced counted, copied, validated (or invalidated), or maintained via voucher management module 113. Data structures corresponding to vouchers may be stored within voucher management module 113. In one embodiment, voucher management module 113 may destroy a voucher when no longer referenced (e.g. with zero reference count). Voucher 105, 109 may represent voucher references to corresponding actual vouchers stored via voucher management module 113.

Attributes and associated values may be managed via attribute managers which can reside inside a kernel, such as attribute managers 117 or in user space runtime, such as attribute managers 121. Attribute managers may be registered in voucher management module 113 to provide different functions via corresponding attribute values (or tags, keys) carried via vouchers. These functions may include activity tracing, importance donation, power assertion management, activity scheduling, or other application functions.

In one embodiment, an attribute manager can determine attribute values for a corresponding attribute, for example, as requested via voucher management module 113. An attribute manager can maintain runtime relationships among execution instances (e.g. processes, threads, etc.) referencing (or having) vouchers specifying the corresponding attribute values. Attribute managers may request updates on properties (e.g. security privileges, priorities, etc.) of execution instances and/or system components (e.g. power management) via system management module 119.

In one embodiment, process 103 (e.g. an application) can send a voucher request for one or more attributes to voucher management module 113 (e.g. a daemon) via IPC handler module 111. In response, voucher management module 113 can request corresponding attribute managers for values of requested attributes to create voucher 105. Voucher management module 113 can return voucher 105 (e.g. a reference) back to process 103, e.g. via IPC handler module 111.

Subsequently, process 103 can send an IPC message carrying voucher 105 to process 107, e.g. via IPC handler module 111. In response, process 107 may send a redeem request with received voucher 105 to voucher management module 113 to take a new identity for execution based on attributes of voucher 105. IPC handler module 111 can forward voucher 105 from the redeem message received to voucher management module 113. In turn, voucher management module 113 may send voucher 109 (e.g. a new voucher or another reference to voucher 105) to process 107.

In response, process 107 may send an adopt message with voucher 109 to inform voucher management module 113 on taking new identities (or properties) based on attribute values included in voucher 109. Process 107 may perform operations or data processing tasks for process 103 based on the new identities. Process 107 may return voucher 109 (e.g. when the data processing tasks for process 105 are completed) back to voucher management module 113, for example, to decrement a reference count of voucher 109 and update attribute values managed in corresponding attribute managers.

Privilege Transfer

In one embodiment, a context of an execution instance (e.g. a process), may include execution privilege, such as a permission to perform an action or access a processing resource. Examples of various privileges may include the ability to create a file in a directory, or to read or delete a file, access a device, or have read or write permission to a socket for communicating over the network. A process may acquire a privilege dynamically by performing a successful verification using, for example, an encryption key, a pass code or other cryptographic or security settings. Privileges may be dynamically distributed among processes based on a voucher mechanism.

For example, a process which has already acquired or established a special privilege required to access a computing resource (e.g. a file) may temporarily and securely transfer the special privilege to another process to perform a task which requires accessing the computing resource. In other words, a process may be updated with a special privilege from a separate process with the special privilege to perform a task. The process may be stripped of the special privilege when the last reference to the voucher containing the special privilege is voluntarily released by the process. In other embodiments, the process may be stripped of the special privilege after the task is completed.

In some embodiments, distributing security privileges via vouchers may prohibit daemons capable of performing certain system level operations (e.g. or tasks) from being hijacked by attackers to perform unintended operations. For example, the daemon may run with little privilege (e.g. being toothless or harmless) unless after redeeming a voucher transferring required privileges or entitlements from another process with such privileges. The daemon may dynamically become more privileged or pick up more privileges via vouchers received from other processes. Without vouchers received from other process, the daemon may not be able to compromise (e.g. make changes to) a system. Thus, possibility of security attacks such as jailbreaking via daemons may be reduced.

In one embodiment, a daemon may be launched in the background running in a low (or restricted) privilege (e.g. via a least privileged model). The daemon may wait for donations of higher privileges from other processes via vouchers. During different periods of time, the daemon may run with different privileges (e.g. incompatible or compatible privileges) according to vouchers received. Incompatible privileges when combined may render a process incapable of performing operations as intended for each individual privilege. For example, a first privilege allowing access to a first file but not access to a second file may be incompatible with a second privilege allowing access to the second file but no access to the first file. Vouchers may grant privileges to enable a daemon to perform operations for different privileges separately without a need to combine these privileges together. Vouchers may grant restricted privileges (but may not restrict privileges).

Figure 2:
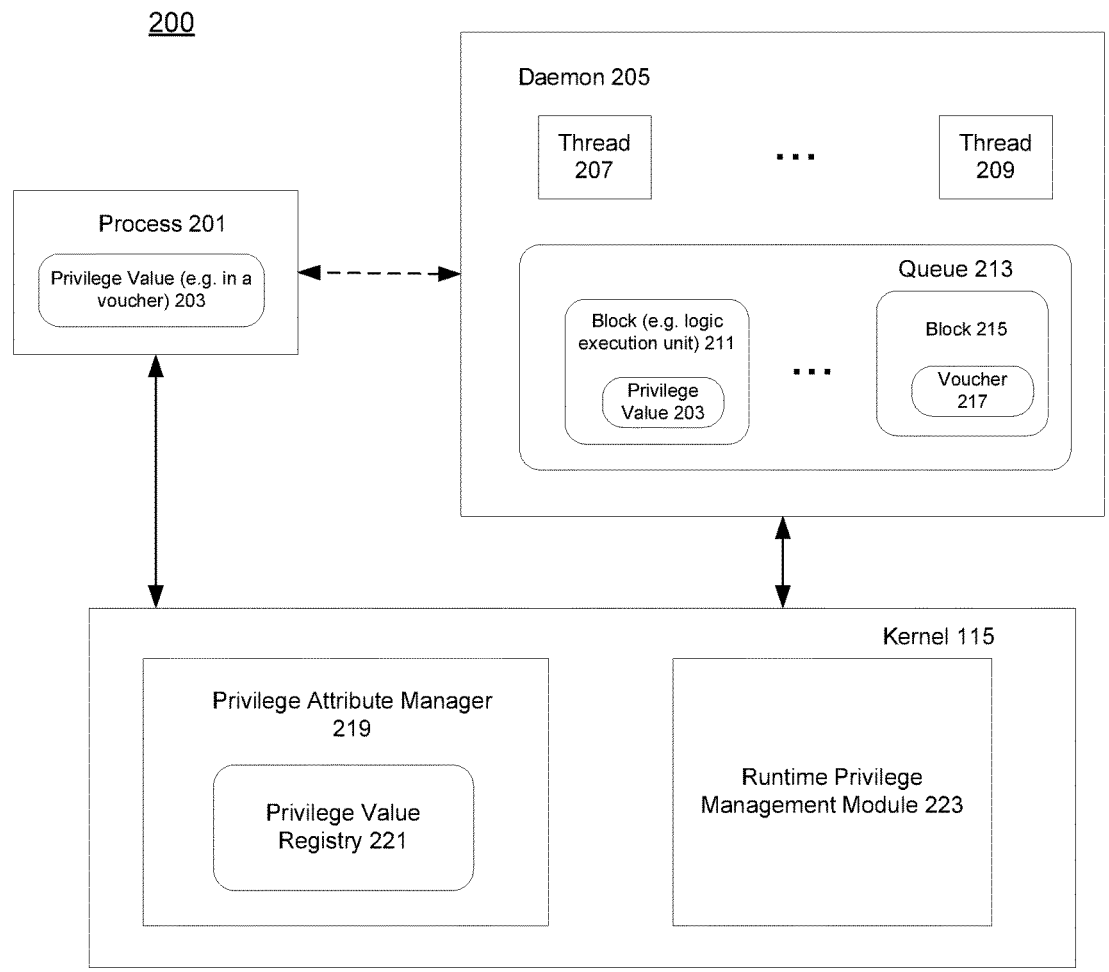
FIG. 2 is a block diagram illustrating one embodiment of a system for transferring security privileges among processes based on vouchers.

FIG. 2 is a block diagram illustrating one embodiment of a system for transferring security privileges among processes based on vouchers. System 200 may include some components of system 100 of FIG. 1. For example, daemon 205 may run as a process of system 100 in the background (e.g. without direct control of an interactive user). Daemon 205 may have instructions capable of implementing system facility, services or other applicable tasks running with the least privileged model.

Process 201 may include, for example, an application running with a user privilege. Process 201 may transfer the user privilege to daemon 205 to run under the user privilege for providing a service to process 201 via IPC mechanism. For example, process 201 may send a voucher request to kernel 115. A voucher subsystem, such as voucher management system 113 of FIG. 1, may return a voucher including privilege value 203 back to process 201.

Privilege attribute manager 219 may generate privilege value 203 for a privilege attribute in a voucher requested by process 201. Privilege value 203 may correspond to a current privilege associated with process 201. For example, privilege attribute manager 219 can identify the current privilege of process 201 via runtime privilege management module 223 to generate privilege value 203. Relationships (e.g. mapping or association) between privilege value 203 and process 201 may be stored or registered in privilege value registry 221. Whether an attribute value in a voucher is valid or not may depend on whether the attribute value is already registered in privilege registry 221 via privilege attribute manager 219.

Privileges may be transferred or donated selectively (e.g. not just all-or-nothing) between processes. For example, privilege attribute manager 219 can determine which privileges or which portions of privileges currently associated with a process to generate a privilege value. A process may specify whether to donate all its privileges or selective portions of its privileges via, for example, parameters of an IPC message or other applicable interface mechanism.

In some embodiments, daemon 205 may include a main thread receiving a voucher with privilege value 203 from process 201 via an IPC message. As a result, one or more threads or worker threads may be dispatched, e.g. asynchronously, to take identities of the received voucher to perform processing tasks or services requested by process 201, for example, using a privilege of process 201 indicated in privilege attribute value 203 of the voucher received.

For example, daemon 205 may include a plurality (e.g. a pool) of threads 207, 209 executing blocks 211, 215 scheduled in queue 211. Block 215 may include voucher 217 specifying execution attributes, such as a privilege value for executing the code in block 215. Block 211 may be scheduled in queue 211 with a voucher with privilege value 203 received from process 201. Block 211 may correspond to a logic execution unit or a set of instructions (e.g. a function or a piece of code to be executed in sequence) to perform services requested by process 201. Block 211 scheduled in queue 213 may include the voucher received from process 201, which can include properties of runtime context of process 201 including privilege value 203 and other applicable attribute values (e.g. resource usage accounting, activity scheduling etc.)

Each thread in daemon 205, such as thread 207 or thread 209, may wake up taking a task scheduled according to queue 213 (e.g. from the head of a queue in sequence) for execution. For example, thread 207 may execute block 211 via identities of process 201 specified in a voucher including privilege value 203. Runtime privilege management module 223 may update execution of thread 207 with a user privilege indicated via privilege value 203 determined by privilege attribute manager 219.

Multiple threads may wake up to pull blocks from one or more queues to execute concurrently with a common voucher or different vouchers. For example, thread 207 may switch vouchers taking on separate blocks from queue 213 at different times with different privileges. Daemon 205 may not run with a specific privilege all the time.

FIG. 3 is a flow diagram illustrating one embodiment of a process to dynamically transfer security privileges from one process to another process. Exemplary process 300 may be performed by a processing logic, including, for example, some components of system 200 of FIG. 2. At block 301, the processing logic of process 300 can run a plurality of processes including a first process and a second process. Each process can have attributes including a privilege to control access by the process to processing resources. A processing resource may include a file, a directory, a processor, a memory space, a network interface, or other applicable assets used for performing data processing tasks.

In one embodiment, the first process may be running with a first privilege. The first process may be prohibited from an access to a processing resource with the first privilege, e.g. controlled via runtime privilege management module 223 of FIG. 2. For example, the first process may be a daemon process invoked or initiated with a default privilege incapable of accessing resources which could cause a system, such as system 200, to be compromised.

In some embodiments, the second process may run with a second privilege allowing or permitting an access to a processing resource not available for processes running with the first privilege. For example, the second process may be a user application assigned with the second privilege according to an authenticated or verification mechanism.

At block 303, the processing logic of process 300 can dynamically transfer the second privilege of the second process to the first process to allow the first process to access a processing resource for the first process to perform a data processing task. For example, the processing logic of process 300 may update attributes of the first process with the second privilege in response to receiving a request from the second process for the first process to perform the data processing task for the second process.

A request received from the second process may include a voucher maintained via a voucher system, such as voucher management module 113 of FIG. 1. The voucher may include attributes indicating the second privilege of the second process. The processing logic of process 300 can send an attribute change request (e.g. a voucher redeem request) including the voucher received from the second process to the voucher system. The attribute change request may be sent from the first process running with the first privilege.

The processing logic of process 300 can receive a separate voucher at the first process from the voucher system in response to a redeem request or an attribute change request. The separate voucher can indicate the transferred attributes from the second process to the first process. The processing logic of process 300 can send a confirmation message (e.g. an adopt message) including the separate voucher to the voucher system via the first process running with the transferred attributes. The confirmation message can indicate that the first process has adopted the transferred attributes according to the separate voucher.

A redeem operation (e.g. via a redeem message) can modify a (set) of voucher attributes, for example, via combining current process attributes with those found in the voucher in some controlled way. An adopt operation (e.g. via an adopt message) can make a voucher "live" for a current execution context. An adopt message may inform the voucher system which voucher is current for a given execution context or thread.

In some embodiments, a voucher can specify attributes to be transferred. For example, the attributes can include a privilege attribute. The processing logic of process 300 can send a voucher request (or a request for a voucher) to the voucher system via the second process running with the second privilege. The voucher request can specify the privilege attribute. The processing logic of process 300 can receive a voucher from the voucher system responding to the voucher request. The received voucher can include a privilege value associated with a privilege attribute to represent the second privilege. The vouchers may be maintained in a storage structure in the voucher system.

The processing logic of process 300 can generate a privilege value associated with the second process and the second privilege in response to a voucher request from the second process. The generated privilege value may be registered or stored in a registry, such as privilege value register 221 of FIG. 2.

In some embodiments, the processing logic of process 300 can verify whether a voucher received via an attribute change request is valid via an attribute value of the voucher. For example, if a privilege value or privilege attribute value in an attribute change request is not registered in a registry for privilege attribute values, the voucher associated with the attribute change request may not be valid.

A voucher may not be created with an invalid attribute value. An attribute manager may perform validation at the time a recipe element is passed to the attribute manager during voucher creation. That recipe element may contain an attribute value from an existing voucher, for example, as proof of access to a voucher containing an original value to which a recipe command (e.g. with the recipe command to create a voucher) is applied. A new attribute value may be provided as a result of the recipe command. In one embodiment, an attribute value of an existing voucher (e.g. via a voucher system) is always valid.

In certain embodiments, the first process may perform a data processing task including a subtask to be performed by a third process. The third process may be running with a third privilege which may be less privileged than the second privilege of the second process. The processing logic of process 300 may send the voucher (e.g. based on IPC message with a reference to the voucher) received from the second process to the third process via the first process to allow the third process to run with the second privilege to perform the subtask.

A privilege value included in the voucher may have an association, e.g. via privilege attribute manger 219 of FIG. 2, indicating the second privilege transferred from the second process for the first process. The processing logic of process 300 can update the association of the privilege value to indicate that the third process running with the second privilege transferred from the second process via the first process.

In one embodiment, the first process may include a plurality of threads executing works scheduled in at least one queue concurrently. The processing logic of process 300 can dispatch at least one work to the queues to perform a data processing task via the first process. Each work may be associated with a block of code and a voucher, e.g. indicating a privilege for executing the block of code. At block 305, the processing logic of process 300 can perform the data processing task for the second process via the first process running with the second privilege. One or more threads of the first process may execute works retrieved from the queues substantially concurrently.

For example, a thread may retrieve a scheduled work from the queues and switch the privilege of the thread according to a privilege value included in a voucher of the retrieved work (e.g. via a redeem request). A thread of the first process may execute a corresponding block with the second privilege of the second process while at least one other thread of the first process is currently executing a separate block of code with a separate privilege different from the second privilege.

In some embodiments, if an exit of the second process is detected while the first process is performing the data processing task for the second process with the transferred attributes including the second privilege, the processing logic of process 300 can dynamically reset the attributes of the first process in response to the detection. For example, when informed of the second process' exit (via other means outside the voucher management system), the processing logic of process 300 (e.g. via an attribute manager) can make the "effective privilege" reflected by that (privilege) attribute value moot. The first process may still run with it—but it has little to no effect. Other attribute managers may allow the privilege to outlive the second process to guarantee completion of operations started on behalf of the second process. Priority-type privileges tend to go away with the donating process' demise, while security-type privileges may tend to live on beyond the donor's demise.

Figure 4:
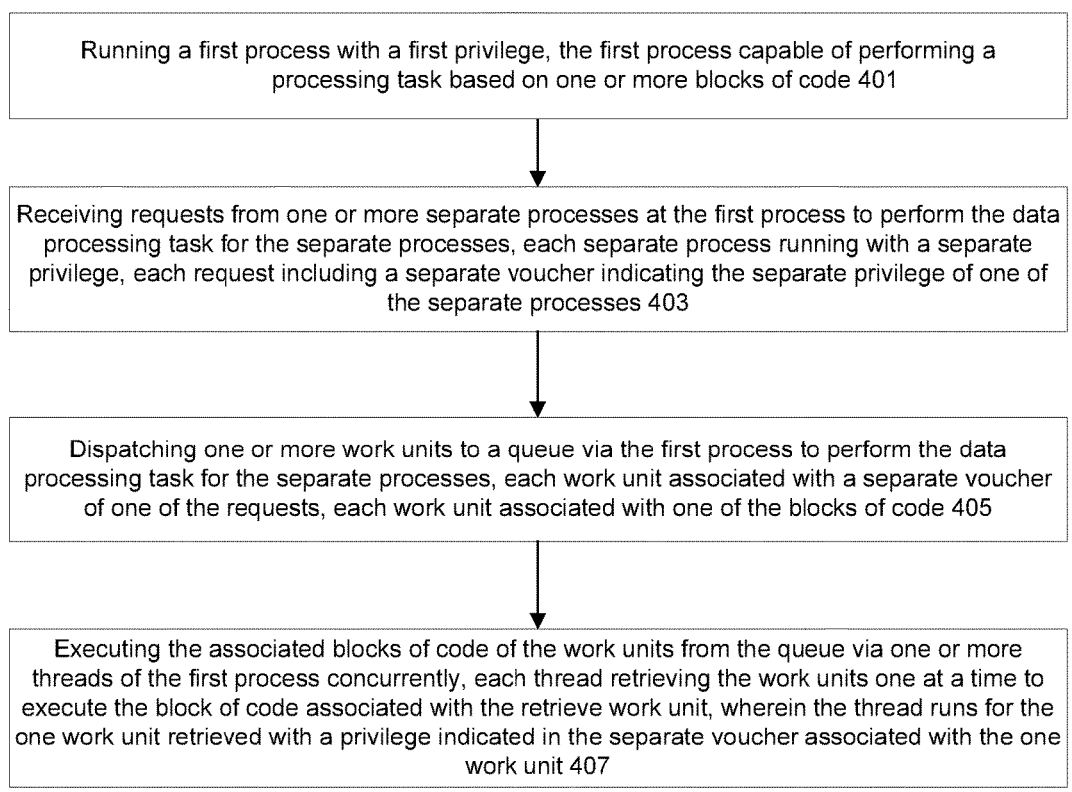
FIG. 4 is a flow diagram illustrating one embodiment of a process for concurrently executing multiple blocks of code associated with separate privileges indicated in separate vouchers.

FIG. 4 is a flow diagram illustrating one embodiment of a process for concurrently executing multiple blocks of code associated with separate privileges indicated in separate vouchers. Exemplary process 400 may be performed by a processing logic, including, for example, some components of system 200 of FIG. 2. At block 401, the processing logic of process 400 can run a first process with a first privilege, the first process capable of performing a processing task based on one or more blocks of code.

At block 403, the processing logic of process 400 can receive requests from one or more separate processes at the first process to perform the data processing task for the separate processes. The requests may be based on messages via inter process communication mechanism. Each separate process may be running with a separate privilege. Each request can include a separate voucher indicating the separate privilege of the requesting process. Each voucher can include one or more attributes including a privilege attribute associated with a privilege value indicating an execution privilege.

At block 405, the processing logic of process 400 can dispatch one or more work units to a queue via the first process to perform the data processing task for the separate processes. Each work unit may be associated with a separate voucher of one of the requests. Each work unit may be associated with one of the blocks of code.

At block 407, the processing logic of process 400 can execute the associated blocks of code of the work units from the queue via one or more threads of the first process concurrently. Each thread may retrieve one of the work units at a time to execute the associated block of code of the one work unit. Each thread may run for the work unit retrieved with a separate privilege indicated in a separate voucher associated with the work unit.

FIG. 4A is a flow diagram illustrating one embodiment of a process for tracking resource accounting using vouchers. Exemplary process 400A may be performed by a processing logic, including, for example, some components of system 100 of FIG. 1. At block 401A, the processing logic of process 400A may run multiple processes (e.g. daemons, applications etc.) in a system, such as system 100 of FIG. 1. Each process may have attributes including a resource accounting attribute, for example, specified in a voucher, such as voucher 217 of FIG. 1.

A resource accounting value assigned for the resource accounting attribute may correspond to an identifier (e.g. activity identifier) uniquely identifying one of a plurality of activities occurring in a system. For example, an activity resource manager in attribute managers 117 of FIG. 1, may generate and maintain the activity identifiers for the resource accounting attribute. An activity may include processing operations caused by, for example, a user interface action, a network event, or other applicable trigger detected by the system. A process may perform operations for different activities based on different activity identifiers dynamically (currently) associated with the process, for example, via vouchers.

At block 403A, the processing logic of process 400A may track resource usage for operations performed for a particular activity via one or more processes. The particular activity may be identified by a particular identifier as attribute value for the resource accounting attribute. The processing logic of process 400A can maintain separate usage charges associated with separate identifiers, for example, in an activity resource manager.

In one embodiment, the processing logic of process 400A can monitor usage of a processing resource, such as cycle time spent in a processor, based on the identifiers. For example, interfaces for identifying when cycle time of a processor is assigned to a process may include a resource accounting attribute value (e.g. an identifier) of the process to identify an activity. The processing logic of process 400A can update the usage charge according to the monitored usage based on the corresponding identifier.

In certain embodiments, a processing resource may include a processing logic, a communication system, a cellular data transceiver, WIFI (wireless local area network products that are based on the Institute of Electrical and Electronics Engineers' 802.11 standards) interface, other applicable wired or wireless network interfaces, or other types of resources in a data processing system. A usage of a processing resource may be accounted for based on the amount of time or number of times the processing resource is dedicated to an activity.

In one embodiment, the processes may include a first process and a second process. At block 405A, the processing logic of process 400A may dynamically update the resource accounting attribute of the second process with the particular identifier in response to a request received at the second process from the first process which is performing operations for a particular activity identified by the particular identifier.

For example, the request may be received via a message based on inter process communication mechanisms. The message may include a reference to a voucher carrying the particular identifier. The second process may receive the request to perform operations for the first process currently associated with the particular activity identified by the particular identifier.

In one embodiment, the operations performed by the first process for the particular activity may account for a first amount of the resource usage. The operations performed by the second process with the particular identifier may account for a second amount of the resource usage. The monitored usage of the processing resource may indicate the first amount and the second amount based on the particular identifier.

The processing logic of process 400A may charge (e.g. record or update) a particular usage charge associated with the particular identifier with the first and second amounts of the resource usage. At block 407A, the processing logic of process 400A can generate a report (e.g. via a user interface) of the resource usage for the particular activity based on the particular identifier. The report may indicate a total amount (or separate amounts) of the resource usage for the particular activity across multiple processes, including the first and second amounts of the resource usage by the first and second processes.

Priority Donation

In one embodiment, priority or importance of a process may be donated or granted to other processes dynamically and temporarily for one process to provide influence on how processing tasks should be performed by other processes for the one process. For example, a foreground application (e.g. process) may be running with a higher priority (or importance) to support timely and snappy responses to a user. A background daemon (e.g. process) capable of a specific task, e.g. networking, indexing, searching etc. . . . , may run with less importance (or lower priority) to support interactivity of the foreground application.

A link between the foreground application and the background daemon may be established via a voucher mechanism to raise importance of the background daemon with the importance of the foreground application for the background daemon to perform associated special service or task for the foreground application. The link may be dropped for the background daemon to return back to its default importance once the requested service is completed.

In some embodiments, daemon processes may be started with a default priority at a level of low importance without affecting, for example, interactivity of a system. In other words, a daemon may run in the background with a default low priority when no process is talking to the daemon. Over time, these daemons may adapt their priorities from other processes via a voucher mechanism to perform tasks or provide services requested.

In one embodiment, the priority or importance of a process such as a daemon may be dynamically boosted by another process by inclusion of a voucher containing a priority/importance privilege along with the request to perform a task. A first process (e.g. a daemon) with a priority boosted by a voucher received (e.g. from a high priority process) may pass along the voucher to a second process (e.g. another daemon) to automatically boost the priority of the second process. The boosted priority of a process to perform a requested task may be dropped from the process when the requested task is completed.

Figure 5:
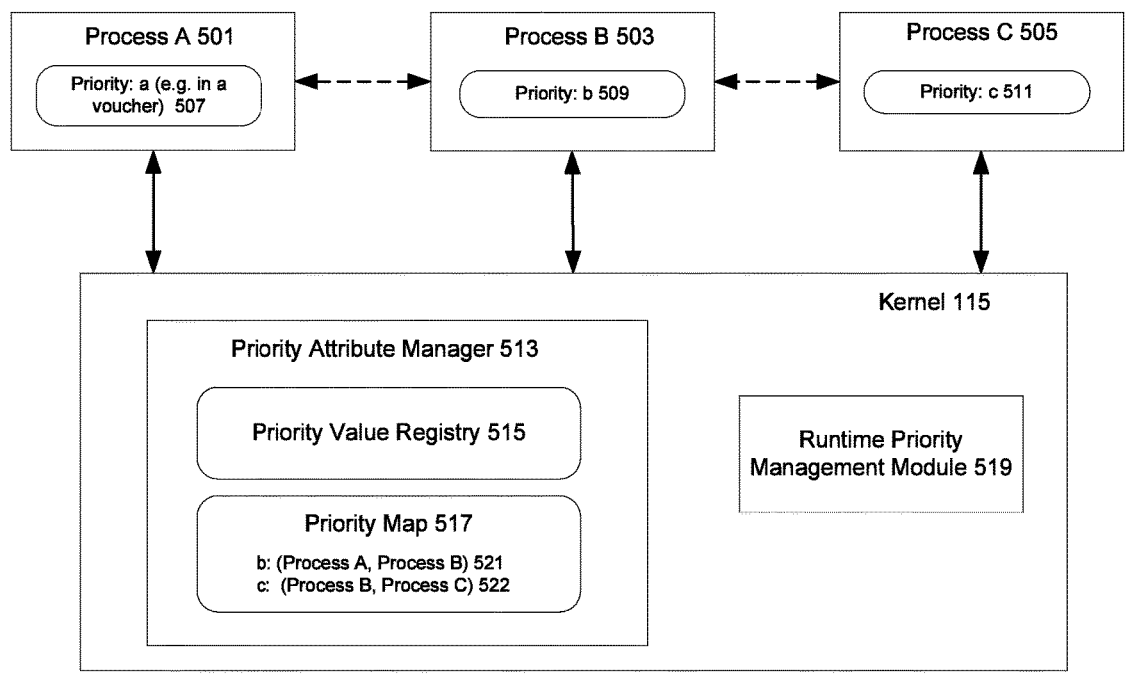
FIG. 5 is a block diagram illustrating one embodiment of a system for donating execution priorities among processes based on vouchers.

FIG. 5 is a block diagram illustrating one embodiment of a system for donating execution priorities among processes based on vouchers. System 500 may include some components of system 100 of FIG. 1. For example, priority attribute manager 513 may include an attribute manager of attribute managers 117 of FIG. 1. In some embodiments, process management module 119 of FIG. 1 may provide runtime priority management based on runtime priority management module 519.

In one embodiment, process A 501 (e.g. an application) may run with an application level priority to support an interactive usage. Process B 503 and Process C 505 may run with priorities lower than the application level priority of process A 501. For example, process B 503 and/or processes C 505 may start as daemon processes in the background running with a default priority configured to be low enough not to affect interactivity of foreground applications.

Process A 501 may execute code making an IPC call to process B 503 to perform a task. In one embodiment, process A 501 may send a voucher request with priority attribute from kernel 115, for example, via voucher management module 113 of FIG. 1. Accordingly, priority attribute manger 513 can generate a priority value a 507 for the priority attribute based on the current priority of process A 501.

For example, runtime priority management module 519 may indicate which level of priority is currently associated with process A 501. In some embodiments, priority attribute manager 513 can maintain priority attribute values in priority value registry 515. Priority attribute manager 513 may register generated priority value a 507 for process A 501 in priority value registry 515.

In one embodiment, process A 501 may send an IPC request with a voucher having attribute value a 507 to process B 503 to perform a task for process A 501. In response, process B 503 may redeem the received voucher from process A 501, for example, when running with a default low priority. Kernel 115 may respond to the redeem request from process B 503 with a separate voucher having a priority attribute value b 509. Process B 503 may run with an updated priority (e.g. the application priority of process A 501) according to priority attribute value b 509.

According to some embodiments, priority attribute manager 513 may generate priority attribute value b 509 based on a redeem request received from process B 503. The redeem request may include a reference to a voucher with priority attribute value a 507 from process A 501. In one embodiment, priority attribute manager 513 may include priority map 517 storing dependency or linkage relationships of a priority value generated. For example, relationship 521 may indicate that priority value b is associated with a priority donation from process A 501 to process B 503. Priority attribute value b 509 may be registered in priority value registry 515. Runtime priority management module 519 may boost priority of process B 503 to the priority of process A 501, for example, according to priority attribute manager 513.

In some embodiments, process B 503 may request process C 505 to perform operations or subtasks when process B 503 is performing a task for process A 501 using a priority or importance donated from process A 501. Process B 503 may send an IPC request with the voucher having priority attribute value b 509 to process C 505. As a result, priority attribute manager 513 may generate and register priority attribute value c 511 for a voucher forwarded to process C 505. Relationship 522 may be stored to indicate a linkage from process C 505 to process B 503 for priority attribute c 511. Relationships 521, 522 may correspond to a linkage chain between processes A, B and C. Priority of Process C 505 may be boosted to the priority of process A to perform subtasks requested by process B.

Dependency relationships among different execution instances may be tracked based on vouchers via, for example, voucher manager management module 113 of FIG. 1. Priority attribute manger 513 may determine whether a process is boosted by another process and whether to drop a boosted priority when a voucher is no longer referenced. For example, process A 501 may exit and cause a decrease of a reference count of a voucher (e.g. with priority attribute value a 507) to zero (or passing a threshold value). As a result, priority attribute manger 513 may drop the boosted priorities of process B 503 and process C 505 back to their previous priority levels (e.g. before being boosted via the priority attribute values) according to the chained relationships in priority map 517.

In some embodiments, when a second process sends an IPC message to a first process, a priority attribute value is automatically added by the IPC message system to a received voucher. This automatic process may be controlled by an attribute on the communications channel (e.g. Mach® port). This received priority attribute is already "redeemed", such that the first process will already be influenced by the priority attribute from the time the message is enqueued, while it is received, and all the way through the execution of the requested task.

Figure 6:
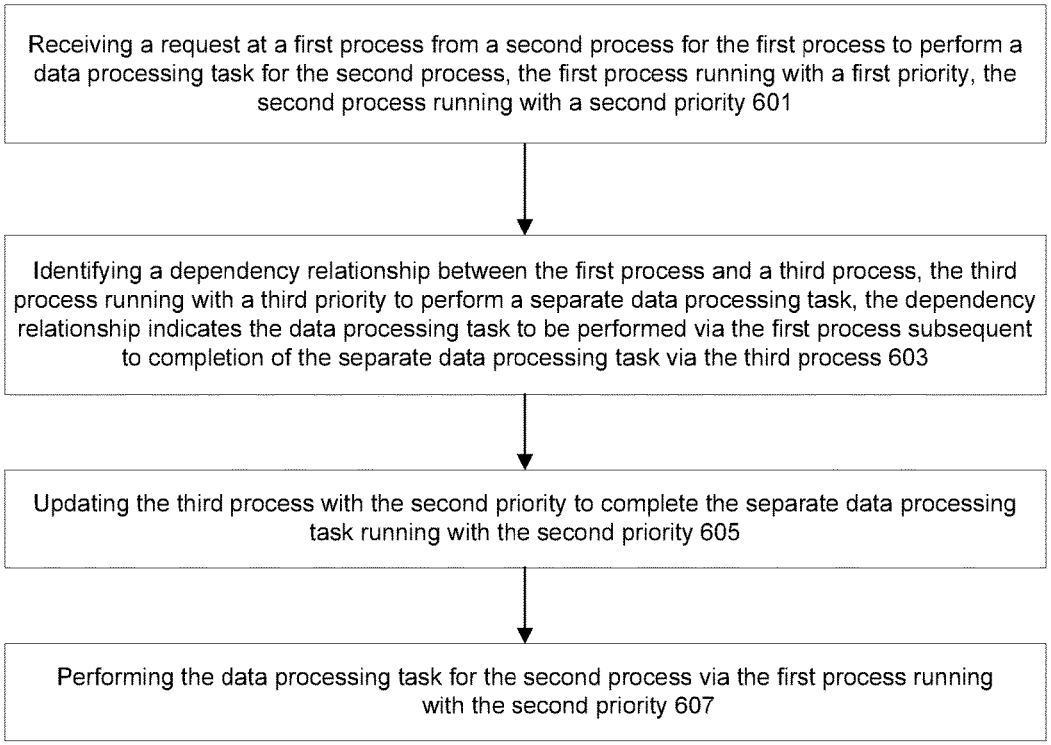
FIG. 6 is a flow diagram illustrating one embodiment of a process to update execution priorities of processes based on vouchers.

FIG. 6 is a flow diagram illustrating one embodiment of a process to update execution priorities of processes based on vouchers. Exemplary process 600 may be performed by a processing logic, including, for example, some components of system 500 of FIG. 5. At block 601, the processing logic of process 600 may receive a request from a second process at a first process to perform a data processing task for the second process. The first process may be running with a first priority when the request is received. The second process may be running with a second priority which can be higher than the first priority when sending the request.

The request received at the first process may include a reference to a voucher. The processing logic of process 600 may send (before sending the request to the first process) a voucher request for the voucher to a voucher system, such as voucher management module 113 of FIG. 1, via the second process running with the second priority. The voucher request may contain a priority attribute (without a value). The processing logic of process 600 may receive the voucher including a priority attribute value via the second process from the voucher system subsequent to the voucher request.

In one embodiment, the second process may send the request based on an interface call via an inter process communication mechanism. The request may include a voucher maintained in a voucher system. The voucher can indicate the second priority of the second process, for example, via attribute values including a priority attribute value. The processing logic of process 600 can send a priority change request (e.g. a voucher redeem request) based on the voucher received to the voucher system from the first process running with the first priority. The processing logic of process may update the priority of the first process with the second priority indicated in the voucher according to the priority change request.

In one embodiment, the processing logic of process 600 may receive a reply from the voucher system at the first process in response to the priority change request. Subsequently, the processing logic of process 600 may send a priority change confirmation message (e.g. a voucher adopt message) from the first process to the voucher system. In some embodiments, the first process may have already been updated to run with the second priority when sending the priority change confirmation message The processing logic of process 600 can register and maintain priority values generated in a registry, such as in priority value registry 515 of FIG. 5. For example, a priority attribute value associated with the second process and the second priority may be generated for a voucher request received from the second process. A priority attribute value associated with a process may be maintained in a priority map, such as priority map 515 of FIG. 5. The processing logic of process 600 can update the priority map for the priority attribute value generated in response to receiving a priority change request having a voucher including the priority attribute value. The processing logic of process 600 can update the priority map to indicate a dependency relationship between two processes.

In some embodiments, the processing logic of process 600 can verify whether the voucher referenced or included in the priority change request is valid in response to receiving a priority change request referencing a voucher. The verification may be based on, for example, a priority attribute manager, such as priority attribute manager 513 of FIG. 5. The voucher may not be valid if the priority value referenced is not yet registered in the registry.

At block 603, the processing logic of process 600 can identify a dependency relationship between the first process and a third process running with a third priority to perform a separate data processing task. The dependency relationship (e.g. execution or resource usage dependency relationship) may indicate that the data processing task requested by the second process is to be performed via the first process subsequent to completion of the separate data processing task of the third process.

In one embodiment, a priority map, such as priority map 517, may include priority values associated with one or more dependency relationships among two or more processes. The processing logic of process 600 can search the priority map to identify one or more processes the first process depends on or waits for. Two dependency relationships (e.g. a→b, b→c) may be transitive corresponding to a third dependency relationship (e.g. a→c). The search may be based on the transitivity of the dependency relationship.

In some embodiments, priorities of the identified one or more processes the first process depending on may be automatically updated according to the second priority of the second process via the voucher received in the first process based on the priority map without requiring requests from the identified processes. Priority of an identified process the first process depending on may be updated or boosted to the second priority if its priority is lower than the second priority.

In one embodiment, the first process may depend on a third process and a fourth process and the fourth process may depend on the third process based on the priority map. For example, the priority map can specify a dependency relationship between the fourth process and the third process based on an IPC request with a voucher from the fourth process to the third process prior to the request received at the first process from the second process. The processing logic of process 600 may detect an exit of the fourth process (e.g. being unloaded from a runtime) to cause an update of the priority map to remove the dependency relationship between the fourth process and the third process.

The processing logic of process 600 may detect completion of work in the fourth process directly as a result of IPC requests from the first process. For example, the detection may be based on reference counting the exposed voucher(s) resulting from those requests. In response to the detection that the fourth process has completed its work (or requested task), the processing logic of process 600 may update the priority map of the fourth process to remove the dependency relationship from the first process. The priority map may still maintain the dependency relationship between the first process and the third process.

In other words, when a daemon in a middle of a chain completes all the work it is directly executing on behalf of a client (i.e. requested by the client), there is no need to continue to raise its priority as a result of that request. However, if it sends work downstream to another daemon, that work would still be affected by the importance of the ultimate (e.g. the original requesting) client AND the intermediate daemon (both still may depend on it completing timely). In this way, a middle-chain daemon process (e.g. a broker-model daemon servicing many clients simultaneously) can be allowed to not have to remain boosted as long as all downstream work is progressing.

The processing logic of process 600 may perform the data processing task for the second process via the first process running with the second priority. The processing logic of process 600 may ensure priorities of other processes the first process depending on may also be boosted to the second priority via the voucher mechanism for the first process to perform the requested data processing task.

FIG. 7 is a flow diagram illustrating one embodiment of a process to generate a voucher for donating execution priority from one task to another task. Exemplary process 700 may be performed by a processing logic, including, for example, some components of system 500 of FIG. 5. At block 701, the processing logic of process 700 may generate a voucher for a first process running with a first privilege. The voucher may include attribute values to indicate the first priority of the first process. A second process capable of performing a data processing task may be running with a second priority.

The processing logic of process 700 may send a message via an IPC mechanism from the first process to the second process. The message may include a reference to the voucher. The second process may receive the voucher based on the reference in the message. At block 703, the processing logic of process 700 can grant the second process with the first priority of the first process to perform the data processing task in response to receiving the voucher from the first process.

At block 705, the processing logic of process 700 can reset the second process back to the second priority in response to a completion indication of the data processing task for the first process by the second process. For example, the completion indication may be identified based on a return of the IPC message requesting the data processing task from the second process to the first process.

Activity Scheduling

In one embodiment, execution scheduling may be based on activity ids included in vouchers associated with processes, threads, or other applicable execution instances. For example, a group of threads having the same activity id (or activity based thread group) may be scheduled together. A thread may pick up a voucher associated with a work unit (e.g. a code block) from a work queue for executing the work unit. The activity id included in the voucher may be used as another dimension (e.g. other than a process id) to determine when the thread is to be given processor time. An activity based thread group may include threads from different processes running with separate priorities. A voucher mechanism may facilitate tracking of activity based thread groups.

For example, a system may schedule threads running codes in response to email activity, such as sending an email message, including user interface handler, security processing, network interface for sending/receiving messages, etc. These threads may be scheduled together regardless which process each thread is associated with. Thread execution order can be allowed to cut through different processes. Thus, inefficiency because of running threads of high priority processes for operations not related to this email activity can be avoided.

In one embodiment, a voucher mechanism can maintain an efficient representation of linkage structures among different execution instances in a system. For example, instead of the costly processing work to provide detailed marks or accounting on each individual owner (e.g. processes, threads) of each resource, short hand marks may be implemented via vouchers to describe a collection (or set) of possible owners of each resource with less cost in system overhead.

When conflicts are detected, detailed analysis of dependencies on individual execution instances may be performed for a resolution. A conflict may occur when scheduled execution instances have blocking conditions to be satisfied by other execution instances. Detailed analysis may include recalling or identifying resources owned by an execution instance (e.g. a process). In some embodiments, linkage information provided from a voucher mechanism may be used for activity id based execution scheduling without performing detailed analysis when there is no conflict in scheduled execution.

A thread may pick up different vouchers during different periods of time to take on different activities. Thus, an activity identifier may be temporarily tied to a thread. A process may include multiple threads simultaneously scheduled for more than one activity (or activity id). A process (or task) may be associated with a process priority. In one embodiment, each activity id picked up by a thread may be of a higher priority (e.g. more important) than a process priority. As an example, threads performing relevant works (e.g. based on code blocks executed) associated with a window scrolling event may be tagged with one activity id with a higher priority than other processes running in a system.

According to certain embodiments, a single thread can be associated with multiple activities simultaneously. For instance (and these are just examples, others are possible):
  in the degenerate case, a thread can be the sole member of an activity;
  a thread can be a member of an activity simply by being a thread within a given process;
  a thread can be a member of another activity associated with a set of work queues (e.g. GCD work queues) if it is processing;
  a thread can be a member of another activity by running a block which inherited a specific activity voucher from within its own process;
  a thread can be a member of another activity by running a block which inherited a specific activity voucher from another process via IPC.

All these (and more) can happen simultaneously.

A contented resource can be associated with one or more types of activities (e.g. including the above listed types of activities) as a hint (or resource hint) as to what needs to happen to make the resource available. A thread trying to gain access to the resource can look at the activity hint, and try to drive (e.g. execute code of) the thread(s) that are members associated with the activity hint. If any of these member threads are blocked on a resource, that resource's activity hint can be referenced and so on until a runnable thread is encountered (in which case it is run) or until none is found (at which point the thread ultimately blocks and gives up the remainder of its quantum).

In one embodiment, dynamic activity linking (at blocking points) may provide the hints required to resolve contention—and to wake the appropriate processes when some progress can be attempted again. An activity id specific to a thread blocked waiting for resolving the contention can be linked to an activity associated with the contention (e.g. blocking condition). The thread may be unblocked when any other thread of the activity is unblocked.

For example, when a thread first encounters a resource it cannot acquire, the thread can link its own private thread activity to the activity in the resource hint (e.g. via activity linkage information). As other threads have done the same, this makes a backward tree (e.g. in the activity linkage information) of possible candidates to run a piece of work when something gets unblocked (the thread that is woken itself can be at the root of that tree but then all the other threads directly or indirectly depending upon are linked up through this tree). This "backward" linkage may be used to summon the highest priority thread waiting for progress to be made when a wakeup occurs anywhere within the tree.

In one embodiment, a process may be identified with a normal activity or normal activity id. Each thread of the process may run with the normal activity id by default until changes or updates are received. For example, a window scroll event may cause creation of an activity id via a voucher system. A thread running with the normal activity id may adopt a voucher carrying the newly created activity id via an IPC message. The thread can be temporarily updated to run with the newly created activity id instead of running with the normal activity id.

In some embodiments, vouchers maintained in a voucher system may have a hierarchical relationship. A voucher (e.g. for a child activity or sub activity) created by overlaying or copying attributes from a separate voucher (e.g. a parent activity) may be hierarchically related to the separate voucher. Information included in multiple vouchers hierarchically related may be combined to allow a scheduling decision (or other application runtime decisions) to be made along multiple dimensions. An effective value of an attribute (or key) in a voucher may correspond to a combined attribute value or flatten value over its hierarchically related vouchers.

An attribute manager, such as in attribute managers 117, 121 of FIG. 1, may include a policy to determine how corresponding attribute values are flattened (e.g. according to XOR bit operations, statistical functions, or other applicable combination or selection operations). According to a certain embodiment, a combined value priority (or importance) attribute value among a stack of hierarchically related vouchers may be selected as the priority value of the voucher which is the last or lowest level in the hierarchy among the stack of vouchers In one embodiment, execution priority may be based on an ordering relationship among activities (or activity ids). A thread group of the activity id highest in the ordering relationship may be selected for execution scheduling. Runnable threads among the selected thread group may be identified for the next scheduled execution. A runnable thread may have no outstanding blocking conditions waiting to be satisfied to proceed on thread execution. A blocking condition may be related to a synchronization structure or object such as a mutex to be unlocked, a condition variable to be signaled etc. which may block execution of a thread waiting for the condition to be satisfied.

If there are no runnable threads in the selected thread group, blocking threads may be identified, for example, by following existing pointers to the blocking threads. Execution of blocking threads may satisfy an outstanding blocking condition of at least one thread of the selected thread group to allow the execution of this one thread. In one embodiment, there is no need to passively raise priority of a whole process (e.g. daemon) a potential blocking thread belongs to. Raising the priority to execute code of the potential blocking thread can resolve the blocking conditions, for example, to continue execution of a selected thread group. Expensive processing resources, such as tracking, marking, and/or recording individual resource/thread dependencies or ownerships to handle blocking threads can be avoided.

In one embodiment, a thread in an activity id based thread group may execute code associated with blocking threads (identified for the thread) with a priority corresponding to the activity id. For example, the thread can take the scheduled contexts of the blocking threads, change priorities of the scheduled contexts to the priority associated with the activity id and execute the code for the blocking threads. As a result, when the blocking conditions are satisfied, such as when certain resources are released, execution can immediately return back to the thread of the activity id without involving an execution scheduler.

In one embodiment, activity ids via a voucher mechanism may provide hints on resolving a blocking condition. For example, a blocking call may indicate an activity id of owners (e.g. threads, processes, etc.) of a resource related to a blocking condition. One by one, threads in the thread group based on the activity id may be selected to run in turn (i.e. one at a time) with raised priority instead of raising priorities of the whole collection of threads in the thread group.

Activity identifiers based on vouchers can provide a way to locate a blocking thread or blocking execution instance quickly (e.g. immediately) without a need to constantly perform expensive and complex operations setting up and/or tracking linkage structures (e.g. priorities, inheritances, ownerships etc.). Propagation of activity ids may be less expensive than propagation of importance or priority via vouchers. Activity id can be cheaply propagated via vouchers. Priority or importance may be updated or propagate when blocking conditions are detected. Potential blocking threads across multiple processes can be identified with more precision via activity ids to resolve a blocking condition for a blocked thread.

In one embodiment, linkage relationships or structures may not be set up until when execution is blocked (e.g. via outstanding blocking conditions). A thread scheduled to execute (e.g. with a highest priority) may setup the linkage structures or information when blocked. Thus, linkage structures may be created only when needed without a need for firing semi or unrelated threads.

In one embodiment, linkage structures may include hierarchical wait queues. A thread with an outstanding blocking condition may be executed to push forward chains of threads to build or construct the wait queues recursively. Dependent threads or execution instances may be identified and given high priority. The wait queues can allow focused traversing back and waking up (or running) waiting threads when a resolution to satisfy the blocking condition occurs (e.g. an input/output event received).

Thus, a collection of threads waiting to be executed to resolve a blocking condition for a thread may be available via wait queues to automatically detect a chain of high priority threads. A scheduler can quickly jump back to the blocked thread via wait queues once the blocking condition is resolved.

Figure 8:
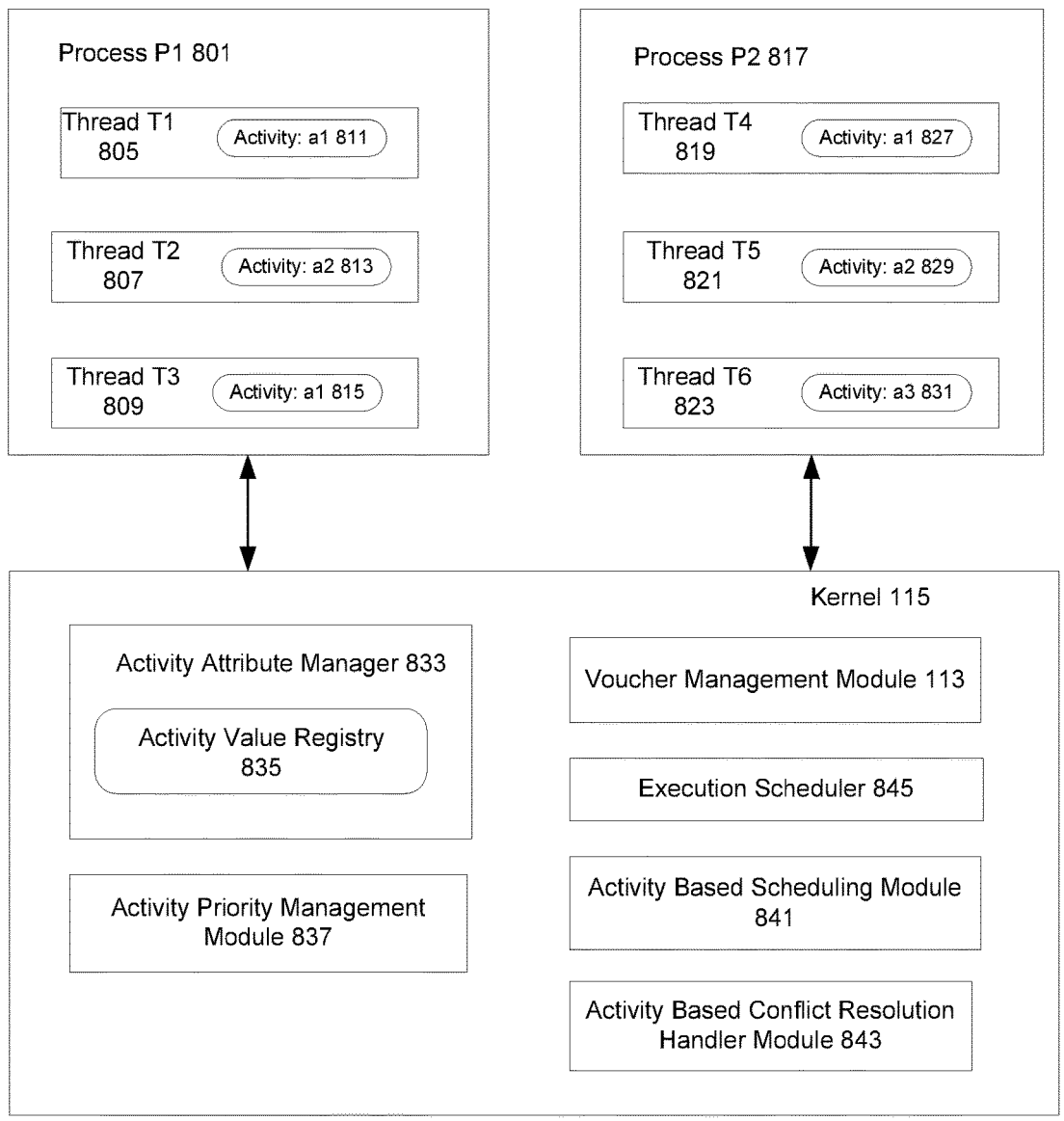
FIG. 8 is a block diagram illustrating one embodiment of a system for scheduling thread executions based on activities tracked via vouchers.

FIG. 8 is a block diagram illustrating one embodiment of a system for scheduling thread executions based on activities tracked via vouchers. System 800 may include some components of system 100 of FIG. 1. For example, activity attribute manager 833 may reside in attribute managers 117 of FIG. 1. Voucher management module 113 can provide a voucher mechanism to distribute activity ids maintained via activity attribute manger 833. Activity ids may correspond to activity attribute values carried in vouchers. Activity attribute manger 833 may register activity ids in activity value registry 835.

In some embodiments, execution scheduler 845 may determine which thread (e.g. a runnable thread) to execute during runtime for system 800. Activity based scheduling module 841 may allow a collection of threads having a common activity (e.g. an activity based thread group) to be scheduled together. Activity priority management module 837 can assign an ordering relationship among different activities (or activity ids) via, for example, configuration settings or runtime states. An activity id based thread group may be selected for execution based on the ordering relation ship provided via activity priority management module 837.

For example, process P1 801 may include threads T1 805, T2 807 and T3 809. Process P2 817 can include threads T4 819, T5 821 and T6 823. Each thread may have adopted a voucher including an activity attribute value or an activity id, such as a1 811, for T1 805, a2 813 for T2 807, a1 815 for T3 809, a1 827 for T4 819, a2 829 for T5 821 and a3 831 for T6 823. In one embodiment, a thread group based on activity id a1 may include threads T1 805, T3 809 and T4 819. Threads T1 805, T3 809 and T4 819 may be collected across processes P1 801 and P2 817 to be scheduled as a group together based on activity id a1.

In one embodiment, activity based conflict resolution handler module 843 can allow a blocked thread to execute the code of a blocking thread using the priority of the blocked thread if the blocking thread is known. The code of the blocking thread may be executed to resolve a conflict or a blocking condition for the blocked thread.

If the blocking thread(s) is not known, activity based conflict resolution handler module 843 may identify a potential activity id based thread group (e.g. according to a hint in an IPC call). Each thread of the potential thread group may be executed with a higher priority (e.g. based on the priority of the blocked thread) one by one (e.g. in a round robin manner) for conflict resolution. Activity based conflict resolution handler module 843 may initiate setting up linkage information during conflict resolution to allow quick execution to jump back quickly to the blocking thread when blocking conditions are resolved.

Figure 9A:
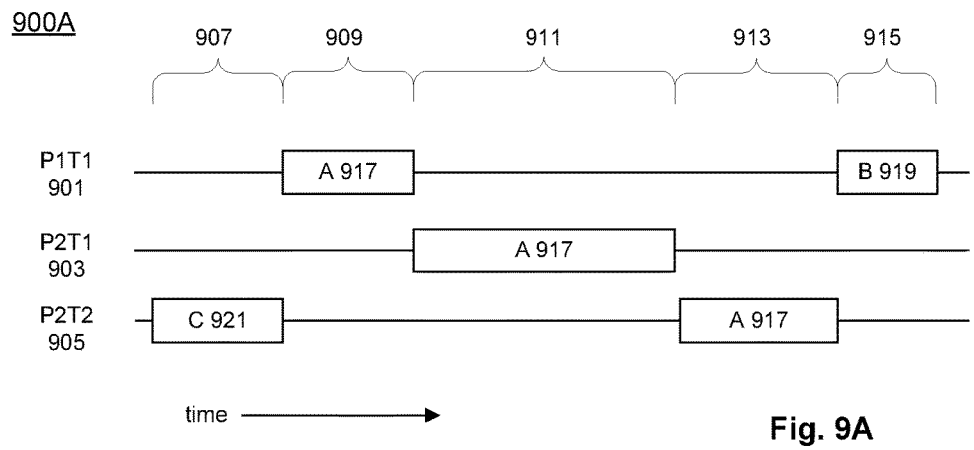
FIGS. 9A-9C are sequence diagrams illustrating threads performing different activities during different time periods scheduled according to vouchers.
Figure 9B:
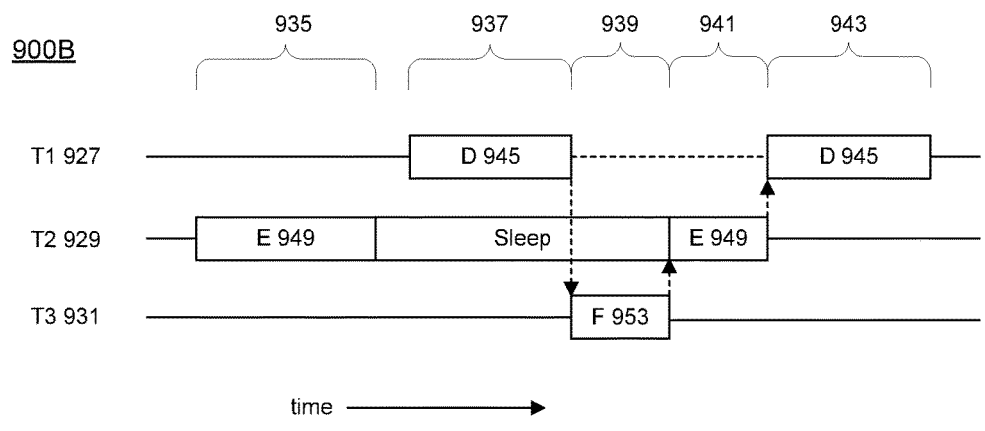
Figure 9C:
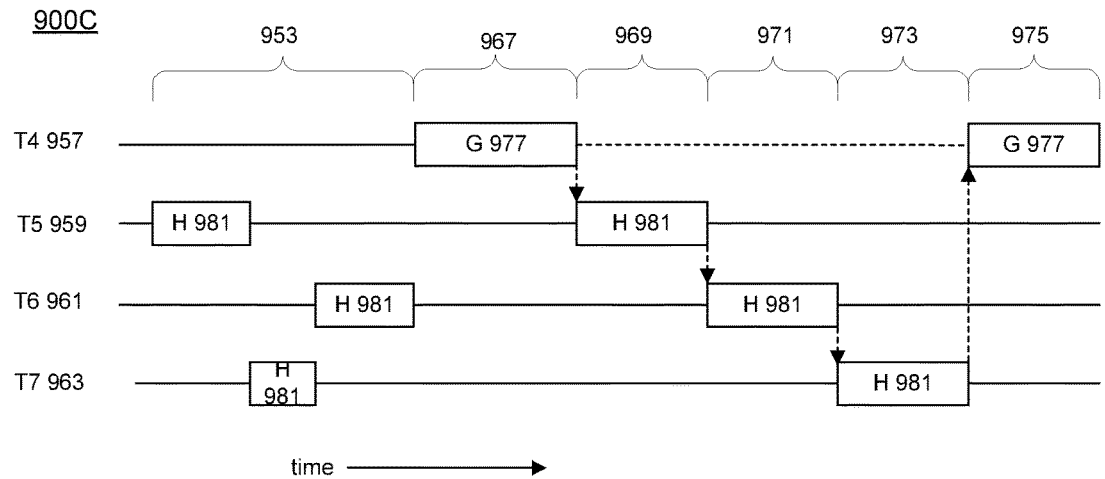

FIGS. 9A-9C are sequence diagrams illustrating threads performing different activities during different time periods scheduled according to vouchers. Sequences 900A-900C may be based on runtime threads running in system 800 of FIG. 8. Turning now to FIG. 9A, threads P1T1 901, P2T1 903 and P2T2 905 may perform operations for different activities A, B and C during different periods of time, for example, via one processor or multiple processors. Threads P2T1 903 and P2T2 905 may belong to one process which does not include thread P1T1.

During periods 909, 911, 913, threads P1T1 901, P2T1 903 and P2T2 905 may be collected as a group associated with activity A 917 (e.g. via vouchers) to be scheduled together for execution (e.g. assigned processor cycles). Activity C 921 may be selected for execution via thread P2T2 905 during period 907. Activity B 919 may have the highest priority during period 915.

Turning now to FIG. 9B, thread T2 929 may perform operations associated with activity E 949 (e.g. via a voucher) during period 935. Thread T2 929 may be blocked waiting for thread T3 931 to complete operations associated with activity F 953. Execution priorities of activity F 953, activity E 949 and activity D 945 may be ordered in an ascending manner according to, for example, activity priority management module 837 of FIG. 8.

In one embodiment, thread T1 927 may be blocked after performing operations for activity D 945 during period 937 with a high priority. Thread T1 927 may identify a blocking thread T2 929 executing code for activity E 949 blocked waiting for another thread T3 931 executing code for activity F 953. Identification of a chain of blocking threads T2 929 associated with activity E 949 and T3 931 associated with activity F 953 may be based on available information, e.g. via pointer tracing without requiring substantial computing resources. In some embodiments, identification of blocking threads may require setting up linkage structures to track down the blocking threads.

Thread T1 927 may execute code of thread T3 931 for activity F 953 with the execution priority of activity D 945 during period 939. Subsequently, during period 941, thread T1 927 may execute code of thread T2 929 associated with activity E 949 with the execution priority of activity D 945 (e.g. high priority) as indicated in the pointers identified corresponding to waking up thread T2 929 for activity E 949. During period 943, thread T1 927 can immediately return (e.g. without involving a scheduler) from executing code of thread T2 929 for activity E949 to continue perform operations for activity D 945 as the blocking condition has been resolved.

Turning now to FIG. 9C, threads T5 959, T6 961 and T7 963 may perform operations for activity (e.g. identifier) H 981 during period 953. Threads T5 959, T6 961 and T7 963 may belong to a thread group based on activity H 981. Activity G 977 may be of a higher execution priority than activity H 981. Thread T4 957 may pick up a voucher with activity G 977 to perform operations for activity G 977 during period 967.

Thread T4 957 may be blocked at the end of period 967. Blocking threads may not be identified (or known) for thread T4 975. A hint may indicate potential blocking threads associated with (or owned by) activity H 981 based on, for example, records of IPC calls. A voucher system may identify a thread group based on activity H 981 for thread T4 957 to resolve conflict. During periods 969, 971, 973, thread T4 957 may execute code for each thread of activity H 981 based thread group in a round robin manner under the priority of activity G 977.

Linkage structures may be set up to track activity or thread dependency information during executions to resolve conflict. The blocking condition may be resolved after executing code for thread T7 963 via thread T4 957. After executing code of thread T7 963 for activity H 981 which can satisfy the blocking condition, thread T4 957 may immediately return back to execute code for activity G 977 during period 975.

FIG. 10 is a flow diagram illustrating one embodiment of a process to schedule threads of a common activity as a group according to vouchers. Exemplary process 1000 may be performed by a processing logic, including, for example, some components of system 800 of FIG. 8. At block 1001, the processing logic of process 1000 may track activities among a plurality of threads across multiple processes running in one or more processors. Each thread may be associated with one of the activities.

Each activity may correspond to a data processing task or operations performed by at least one of these threads of one or more processes. The data processing operations may be incurred in response to occurrence of an event, such as a user action, a network signal, or other applicable initiations to a system. The activities can be identified by activity identifiers. A priority order for execution may be maintained among these activity identifiers.

In one embodiment, the processing logic of process 1000 can store the activity identifiers in a registry. Each activity identifier may be associated with a reference count indicating whether a corresponding activity identified by the activity identifier has been completed.

For example, a first process may receive a message from a second process to perform operations for a first activity with a first activity identifier. The message can include the first activity identifier based on an inter process communication mechanism. The processing logic of process 1000 can receive from the first process a request (e.g. a voucher redeem request) including a first activity identifier. In response, the processing logic of process 1000 can update (e.g. increase by one) a first reference count of the first activity identifier to indicate an additional reference.

In one embodiment, a registry, such as activity value registry 835, may include associations between threads and activity identifiers. The processing logic of process 1000 can update the associations in response to a request from a first thread with an activity identifier to indicate that the first thread is associated with the activity identifier. The request may be, for example, a voucher redeem request sent from the first thread before performing an operation for an activity identified by the activity identifier.

In one embodiment, a request from a thread or process, such as a voucher redeem request, can include or refer to a voucher maintained via a voucher system. The voucher can specify an activity identifier, for example, via an activity attribute. The processing logic of process 1000 can verify whether the voucher received via the request is valid via the voucher system. If the voucher is not valid, the reference count associated with the activity identifier may not be updated in the voucher system. A valid voucher may be created via the voucher system and received via an IPC message for the request.

There may be no need to verify the activity identifier with respect to the voucher. A valid voucher can refer to the activity identifier. If the voucher is not valid, whether the voucher refers to an activity identifier may not be known as the content of an invalid voucher may not be examined.

At block 1003, the processing logic of process 1000 can identify a group of threads associated with an activity. The group of threads can be identified via the associations between the threads and the activity identifiers stored in a registry based on, for example, activity attribute manager 833. The group of threads may be identified based on an activity identifier for execution scheduling, conflict resolution or other applicable thread grouping.

At block 1005, the processing logic of process 1000 may select a thread from an activity id based thread group identified for next scheduled execution in the processors. The processes may be prioritized via a process priority. The activity id based thread group may belong to two or more of the processes. In one embodiment, a thread may be selected from within the identified thread group based on the process priority associated with the thread. Alternatively or optionally, a runnable thread in the thread group may have a higher priority to be selected than a non runnable thread of the thread group.

At block 1007, the processing logic of process 1000 can execute the selected thread for next execution in the processors. If the selected thread is not runnable (e.g. no thread in the identified thread group is runnable) waiting for a blocking condition to be satisfied, the processing logic of process 1000 may perform conflict resolution operations to satisfy or remove the blocking condition (or conflicts). For example, a blocking condition related to a lock may be satisfied when the lock is released. A lock may include a synchronization mechanism for enforcing a mutual exclusion concurrency control policy to limit access to a resource.

In one embodiment, if one of the threads has already been identified for satisfying a blocking condition of a selected thread which is being blocked, the selected thread can execute code of the identified thread to resolve the blocking condition. Subsequent to the solution of the blocking condition, the execution can return back to the code of the selected thread without involving a scheduler as the selected thread is already running.

In some embodiments, if no thread has been identified for satisfying the blocking condition of the selected threads, the processing logic of process 1000 may heuristically determine a particular thread group of a particular activity identifier based on, for example, a hint of an IPC call. Other hints may include membership in the same task as the resource holder, being processed in the same set of GCD (Grand Central Dispatch) queues (and therefore a member of the same thread work group) or other applicable runtime information. Execution of one or more of the particular thread group may resolve (or satisfy) the blocking condition of the selected thread. The processing logic of process 1000 can execute the code of each of the particular thread group one by one (e.g. in a round robin manner) via the execution priority of the selected thread.

The processing logic of process 1000 may recursively perform operations, e.g. based on the execution priority of the selected thread until the blocking condition is satisfied. The selected thread may be executed substantially immediately right after the blocking condition is satisfied. In one embodiment, the processing logic of process 1000 can set up linkage structures describing ownership or dependency relationship among threads, process and/or resources when performing operations for conflict resolution.

FIG. 11 is a flow diagram illustrating one embodiment of a process to track activities of threads to resolve blocking conditions. Exemplary process 1100 may be performed by a processing logic, including, for example, some components of system 800 of FIG. 8. At block 1101, the processing logic of process 1100 may track one or more activities related to operations performed by execution instances (e.g. threads, processes, etc.) via vouchers maintained by a voucher system.

Relationships among the activities identified by activity identifiers may provide information to resolve (or satisfy) a blocking condition of a thread. Execution of the thread may be halted waiting for satisfaction of the blocking condition. For example, one of the activities may be identified based on hints or other applicable information indicating possibility of resolving the blocking condition if one or more threads of the identified activity are executed. Each thread of the identified activity may have a reference to a voucher with an activity attribute indicating the identified activity.

In one embodiment, a voucher indicating an activity identifier may be passed from one process to another process via an inter process message. The message may be sent from a first process to the second process for the second process to perform operations for the indicated activity identified. The activity identifier can have a reference count (e.g. based on vouchers) counting a number of the references via messages of the inter process communication to maintain relationships among the activity identifiers.

At block 1103, the processing logic of process 1100 can execute executable code associated with the threads of the identified activity via the thread which is blocked until the blocking condition is satisfied. According to a certain embodiment, the processing logic of process 1100 may execute each separate code associated with each thread of the identified activity in turn with execution priority of the blocked thread in a round robin manner. At block 1105, the processing logic of process 1100 can resume execution of the blocked thread subsequent to the satisfaction of the blocking condition.

Figure 11A:
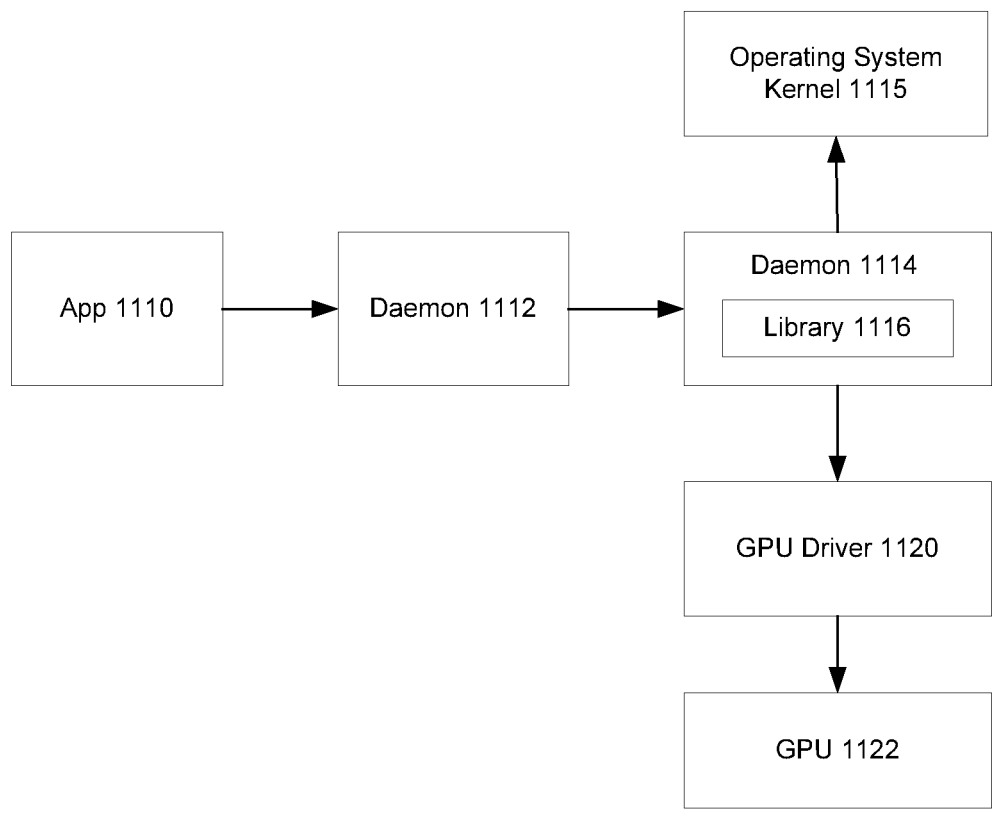
FIG. 11A shows an example of a software architecture in which a voucher system can be used to select a processor from a set of processors based upon a state of an originating application.
Figure 11B:
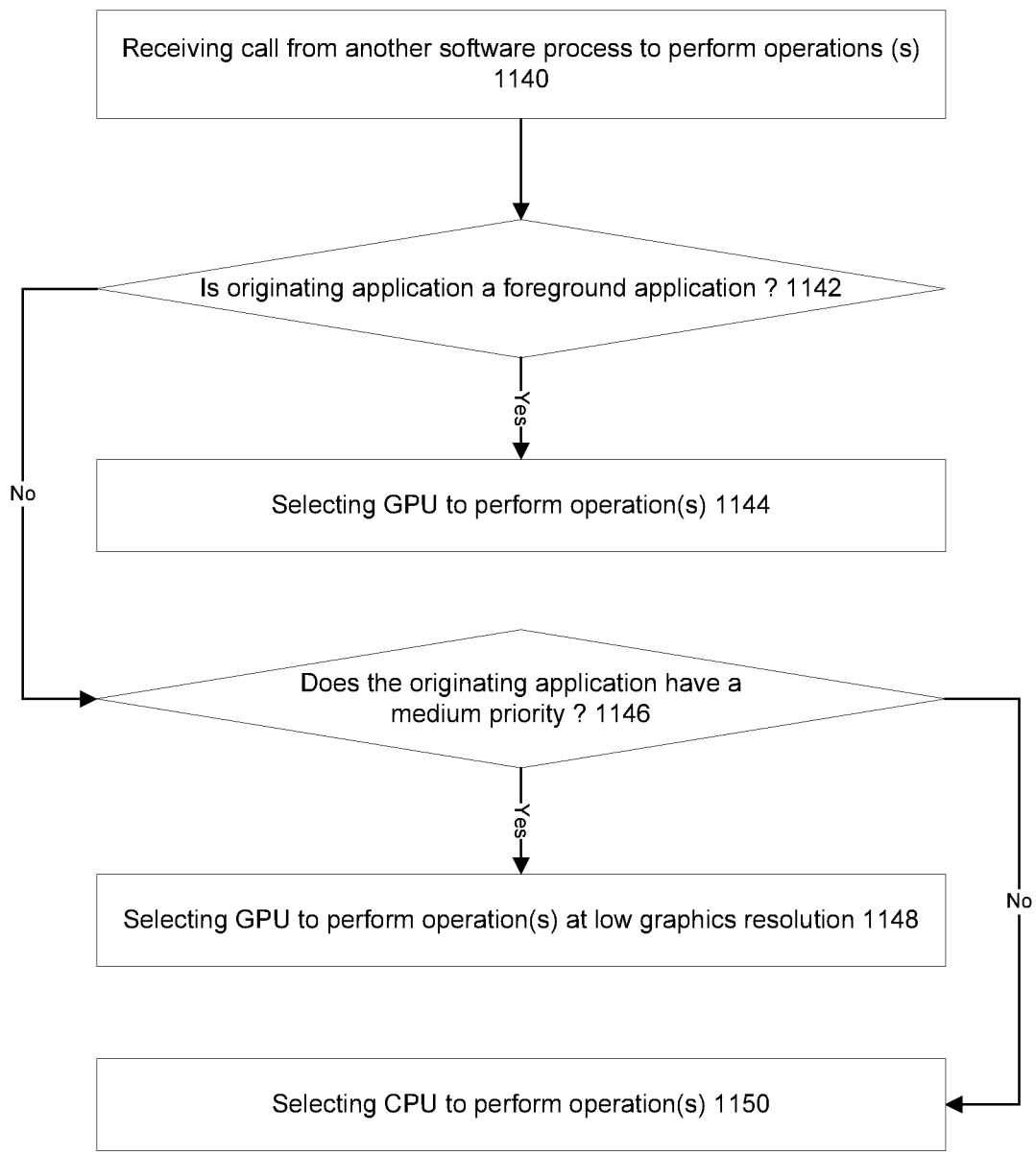
FIG. 11B shows an example of a method to perform processor selection.

FIGS. 11A and 11B show an embodiment in which multiple executing software processes interact and use one or more vouchers to obtain information about the software processes in order to select between a plurality of processing units, for example, including one ore more CPU cores and one or more GPU (Graphics Processing Unit) cores. The selection of a processing unit can use information from the one or more vouchers to determine a state of a software process that originated the action that caused the interaction of the multiple software processes. The state can be or include, for example, whether the software process that originated the action ("originating application") is a foreground application or a background application, and that state can be used to decide which of the processing units is selected to execute the software process that received a call or request to perform work for the origination application.

The example shown in FIG. 11A includes a software application 1010, which can be a foreground or background application such as an email program, a contact program or other software program with which a user can interact (e.g. provide inputs and receive outputs), and two software daemon processes 1112 and 1114 that perform operations in the background in regards to calls from other software processes.

As shown in FIG. 11A, the application 1110 makes a call to daemon process 1112 to perform an operation for application 1110; the call from application 1110 can result from an input from a user interacting with application 1110 which is a foreground application or from an event associated with application 1110 while it is a background application (for example, a push notification that is received by application 1110 while it is a background application).

When daemon 1112 receives call 1, it performs one or more operations which in turn cause daemon 1112 to call daemon 1114 (via call 2). The voucher methods described herein can be used throughout the interaction between application 1110, daemon 1112 and daemon 1114 such that when daemon 1114 receives call 2, the voucher system can determine the origin of call 1 to ultimately identify the originating application (in this case, application 1110). Daemon 1114 can request the operating system kernel 1115 (such as kernel 115 of FIG. 8) to identify the originating application using the voucher system described herein and can request the kernel 1115 to specify the state of the originating application; the state (returned by kernel 1115 to daemon 1114) can then be used to decide where to execute software that is part of daemon 1114, such as library 1116 that is part of daemon 1114 (or a library that can be called by daemon 1114).

In one embodiment, library 1116 can be part of the graphics library known as OpenGL or in another embodiment can call an Open GL library. In some embodiments, if the state indicates that the originating application is a foreground application, then the daemon 1114 can cause the GPU 1122 to execute the software in daemon 1114 in the GPU 1122 (rather than execute that software in a CPU). An example of a method which can use the architecture of FIG. 11A is shown in the flowchart of FIG. 11B.

Turning now to FIG. 11B, a method can begin in operation 1140 in which daemon 1114 can receive a call to cause the execution of software in library 1116. In operation 1142, the method determines whether the originating application is a foreground application or a background application. A foreground application is normally an application that has at least some view or window that is visible on a display (and not obscured by other view of other applications) and has at least one input form (such as an input from a keyboard, mouse, or touch input device) and hence a user input will be directed to and received by the foreground application (and not to other applications). A background application, on the other hand, will not have the input forms and may not be visible at all on a display.

The operation 1142 can use the voucher system described herein to determine the originating application and the kernel can determine whether the originating application is a foreground application or a background application. In the example shown in FIG. 11B, if the kernel determines that the originating application is a foreground application, then the GPU will be selected, in operation 1144, to perform the execution of the software in library 1116; on the other hand, if the kernel determines in operation 1142 that the originating application is a background application, then the processing proceeds to operation 1146 in which the kernel determines the operating priority of the originating application and if the originating application has a medium priority, then the GPU is scheduled, in operation 1148, to perform the execution of the software in library 1116 at a low graphics resolution. If the operating priority of the originating application is lower than medium priority, then, in operation 1150, the CPU (e.g. a core of a CPU) is selected to perform the execution of the software in library 1116.

Power Assertion

Power states of certain device components can remain asserted via power assertion attributes of vouchers propagated among execution instances (e.g. processes, applications, daemons, threads etc.) before operations associated with the vouchers are completed via these execution instances. Vouchers with power assertion attributes can allow an application to request a power assertion and forward the requested power assertion to other processes to perform operations. The requested power assertion can still be honored (or remain in effect) before the operations are completed, even after the application releases the requested power assertion.

A power assertion request may be issued (e.g. by an application) to provide a hint to an operating system that certain components (e.g. the processor, display screen, network, hard disks, etc.) should be kept at a certain power level (e.g. asserted) or not to go to sleep before the power assertion is released. For example, a network notification daemon can listen to an incoming message event to take a power assertion on a machine and notify (e.g. wake up) a message synchronization daemon via vouchers with attributes of the power assertion to perform synchronization operations between multiple message related applications. The synchronization daemon can complete the synchronization operations before the machine goes to sleep regardless whether the network notification daemon drops the power assertion before or after the synchronization operations are completed.

In one embodiment, a power assertion can be issued via a voucher request with power assertion attribute. A power assertion attribute manager may maintain or register power assertion attribute values via, for example, a power daemon (e.g. in user space). Additional power assertion requests (e.g. for different components or same components) may be obtained based on an existing voucher with power assertion attribute values. The voucher system can provide a new voucher by duplicating or overlaying an existing voucher with updated power assertion attribute values. When power assertions are to be released may be determined according to when related vouchers are no longer referenced as automatically tracked by the voucher system.

Power assertion attribute values may include a finite length of bits. Each bit corresponds to a separate device component, such as a disk, a memory, a display screen, a processor, a network interface card, or other applicable device component having a power state. A bit value one can indicate existence of a power assertion request for the corresponding component. Multiple power assertion bit values may be combined (e.g. via power attribute manager) via binary bit operations, such as logic OR operation, to one combined power assertion value. Power attribute manager can send power management requests based on a combined power attribute value to a kernel for managing device power states.

Figure 12:
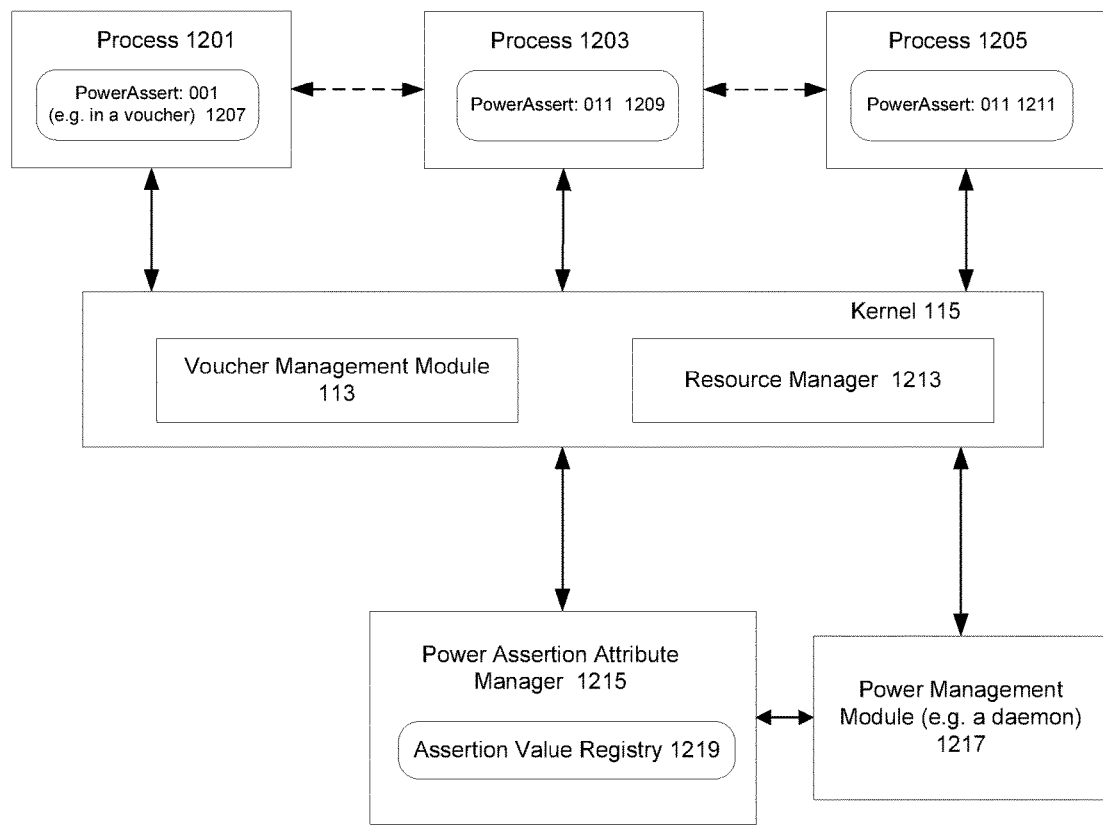
FIG. 12 is a block diagram illustrating one embodiment of a system to distribute power assertion requests among different processes of a task via vouchers to maintain a power level.

FIG. 12 is a block diagram illustrating one embodiment of a system to distribute power assertion requests among different processes of a task via vouchers to maintain a power level. System 1200 may include some components of system 100 of FIG. 1. For example, power assertions can be requested via vouchers managed in voucher management module 113 of FIG. 1. In one embodiment, power assertion attribute manager 1215 may register the power assertion attribute with voucher management module 113 to allow propagation of power assertion requests among different processes via vouchers.

In one embodiment, voucher management module 113 can request a power assertion attribute value from power assertion attribute manager 1215 based on the voucher request received from process 1201. Power assertion attribute manage 1215 can generate the power assertion attribute value for the voucher request. Each power assertion attribute value may be a bit vector with each vector position or field corresponding to one device component with a power state. Each bit of the bit vector may be set to 1 or 0 depending on whether the corresponding component is included in a power assertion request.

In one embodiment, power assertion attribute manager 1215 can maintain outstanding power assertion attribute values in assertion value registry 1219. Each power assertion attribute value may be associated with a reference count indicating a current number of references by different vouchers in voucher management module 113. A power assertion value may be removed (e.g. no longer outstanding) if not referenced by any vouchers. Each time a power assertion value is assigned to a voucher attribute, the reference count of the power assertion value may be increased by one. Voucher management module 113 may notify power assertion attribute manger 1215 to decrease a reference count of an existing power assertion value when a voucher having this existing power assertion value is deleted (e.g. not referenced or used).

Power assertion attribute manager 1215 can track changes in outstanding power assertion values to request/release power assertions to corresponding device components via, for example, power management module 1217. Power assertion attribute manager 1215 can combine outstanding power assertion values to determine whether there is any change in power assertion requests. Different power assertion values (e.g. bit vectors) may be combined according to bit level binary operations (e.g. OR, XOR or other applicable operations). A new power assertion value may be generated by combining multiple existing (or outstanding) power assertion values.

In one embodiment, process 1201 can send a voucher request (e.g. via an IPC message) with power assertion attributes to voucher management module 113 for requesting a power assertion on a device component. In response, voucher management module 113 can return voucher 1207 with power assertion attribute value (e.g. PowerAssert) 001 as a bit vector indicating a power assertion has been issued for the device component corresponding to the third bit of the bit vector.

Process 1201 may send a message to process 1203 to perform operations for process 1201 via voucher 1207 passing power assertion requests. In a certain embodiment, process 1203 may issue additional power assertion requests via voucher management module 113 while performing the operations for process 1201. As a result of the additional power assertion requests, process 1203 may have voucher 1209 with an updated power assertion attribute value 011, for example, indicating a power assertion request for a device component corresponding to the second bit of a bit vector for a power assertion attribute value has been issued.

Process 1203, while performing operations for process 1201, may request process 1205 to perform additional operations (indirectly for process 1203) passing along voucher 1209. Process 1205 may adopt voucher 1211 with the same power attribute value as voucher 1209 (e.g. referencing the same actual voucher in voucher management module 113). Power assertions indicated in the power assertion attribute value of voucher 1211 may not be released before process 1205 completes operations for process 1203. In some embodiments, an exit (e.g. process crashes or being unloaded) of process 1205 may indicate its corresponding voucher reference has been removed to prevent zombie power assertion requests.

FIG. 13 is a flow diagram illustrating one embodiment of a process to maintain a power level of a device before a data processing task is completed. Exemplary process 1300 may be performed by a processing logic, including, for example, some components of system 1200 of FIG. 12. At block 1301, the processing logic of process 1300 can maintain power assertion indicators for one or more device components of a device. Each device component may have a power level, managed via, for example, resource manager 1213 of FIG. 12, for power conservation. A power assertion indicator can indicate whether the power level of the device component corresponding to this power assertion indicator is allowed to be lowered.

Power assertion indicators may correspond to one or more power assertion attribute values provided, for example, via power assertion attribute manager 1215 of FIG. 12. Each attribute value (or power assertion attribute value) can include a bit vector. Each bit of the bit vector may correspond to one of device components of a device. Each bit of an attribute value can indicate whether there is a power assertion request (or power assertion request) for its corresponding device component via the attribute value. A bit value (e.g. 1) can represent an outstanding power assertion request for its corresponding device component.

At block 1303, the processing logic of process 1300 can send a power assertion request from a first process for a data processing task to prevent lowering the power level of the device component before the data processing task is completed. For example, the power assertion request may correspond to a voucher request with a power assert (or assertion) attribute. The power assertion request may identify the device component whose power level should not be lowered. The processing logic of process 1300 may issue the power assertion request based on a program interface call via an inter process communication mechanism.

The processing logic of process 1300 can receive a reply from the voucher system in response to the power assertion request from the first process. The reply may include a voucher maintained and/or generated via the voucher system. The voucher may have attributes including a power assertion attribute associated with an attribute value to indicate the requested power assertion on the device component. An attribute value for a power assertion attribute may include a bit vector having bit fields corresponding to one or more device components in a device. As a bit vector, each bit of the attribute value can indicate whether the attribute value represents a power assertion request for a device component corresponding to the bit.

In some embodiments, an attribute value may be associated with a voucher count maintained in, for example an attribute manager, such as power assertion attribute manager 1215 of FIG. 12. The power level of a device component associated with the attribute value may not be lowered if the voucher count indicates that there is at least one voucher which includes the attribute value with the power assertion attribute for the device component. The voucher count of the attribute value may be updated when the voucher is deleted. For example, a voucher system may delete a voucher when the voucher is no longer referenced (e.g. with a zero reference count). The voucher system may cause an update of the voucher count in an attribute manager.

In one embodiment, a power assertion request can include an existing voucher which was previously requested from a voucher system by the first process. The existing voucher may have already an existing attribute value for the power assertion attribute which represents existing power assertion requests previously made for one or more devices components. The processing logic of process 1300 can generate a new attribute value based on the current power assertion request and the existing attribute value, for example, via power assertion attribute manager 1215 of FIG. 12. The new attribute value may represent an aggregation of the power assertion request currently issued and the previously requested power assertion requests which have not yet been released. For example, the voucher may be generated via an overlay of the existing voucher with a copy of the attributes included in the existing voucher The processing logic of process 1300 can remove the existing voucher as a result of generating the new voucher based on the existing voucher. In some embodiments, the processing logic of process 1300 can decrement a reference count of the existing voucher for the removal of the existing voucher. The existing voucher may be deleted if the reference count of the existing voucher becomes zero.

At block 1305, the processing logic of process 1300 can receive a request at a second process from the first process for the second process to perform operations for a data processing task. The request may include the voucher (or a reference to the voucher) with attributes indicating a power assertion request on a device component. The power level of the device component may not be lowered before the operations are completed via the second process.

In one embodiment, the request received at the second process may include a voucher requested from the first process. The processing logic of process 1300 can send a redeem request including the voucher from the first process to the voucher system to maintain a power assertion request of a device component indicated in the voucher. The redeem request for the voucher may prevent lowering the power level of the device component before the second process completes performing the operations for the first process.

In some embodiments, the voucher may be associated with a reference count in the voucher system. The second process may acquire a reference to the voucher of the first process to perform operations for the first process. The redeem request from the second process may cause an increase of the reference count of the voucher in the voucher system. The power level of the device component with a power assertion request indicated in the voucher may be prevented from being lowered if at least one process has a reference to the voucher, for example, based on the reference count.

The processing logic of process 1300 may verify validity (e.g. based on attribute values) of the voucher associated with a redeem request received from the second process. No reference counts of vouchers are updated if the voucher of the redeem request is not valid. On detecting an exit of the second process before completing the operations for the first process, in one embodiment, the processing logic of process 1300 may decrement the reference count of the voucher. At block 1307, the processing logic of process 1300 may lower the power level of the device component after the data processing task performed via the first process and the second process is completed.

FIG. 14 is a flow diagram illustrating one embodiment of a process to generate a voucher to pass a power assertion request between separate processes performing a common data processing task to maintain a power level of a device. Exemplary process 1400 may be performed by a processing logic, including, for example, some components of system 1200 of FIG. 12. At block 1401, the processing logic of process 1400 can maintain a power assertion status for a device component having a power level. The power assertion status may indicate whether the power level of the device component can be lowered (e.g. to conserve device power usage).

At block 1403, the processing logic of process 1400 can generate a voucher for a first process to indicate an outstanding request to prevent the power level of the device component from being lowered. The power assertion status for the device component may be associated with a reference count of the voucher. For example, the power assertion status can indicate whether there is any outstanding power assertion request on the device component based on the number of processes currently referring to the voucher. If the reference count on the voucher indicates at least one process currently referring to the voucher, the power level of the device component may not be lowered for the outstanding power assertion request in the voucher.

At block 1405, the processing logic of process 1400 may update the power assertion status of the device component in response to receiving the voucher from a second process. The power assertion status may be updated to indicate an additional outstanding request to prevent the power level of the device component from being lowered.

The processing logic of process 1400 can send a message passing the voucher via an inter process communication mechanism from the first process to the second process. The message may include a reference to the voucher for the second process.

At block 1407, the processing logic of process 1400 may lower the power level of the device component when the power assertion status indicates that there is no outstanding request to prevent the power level of the device component from being lowered. For example, the power level of the device component may be lowered after the outstanding power assertion request from the first process and the additional outstanding request power assertion request from the second process have been released.

Figure 15:
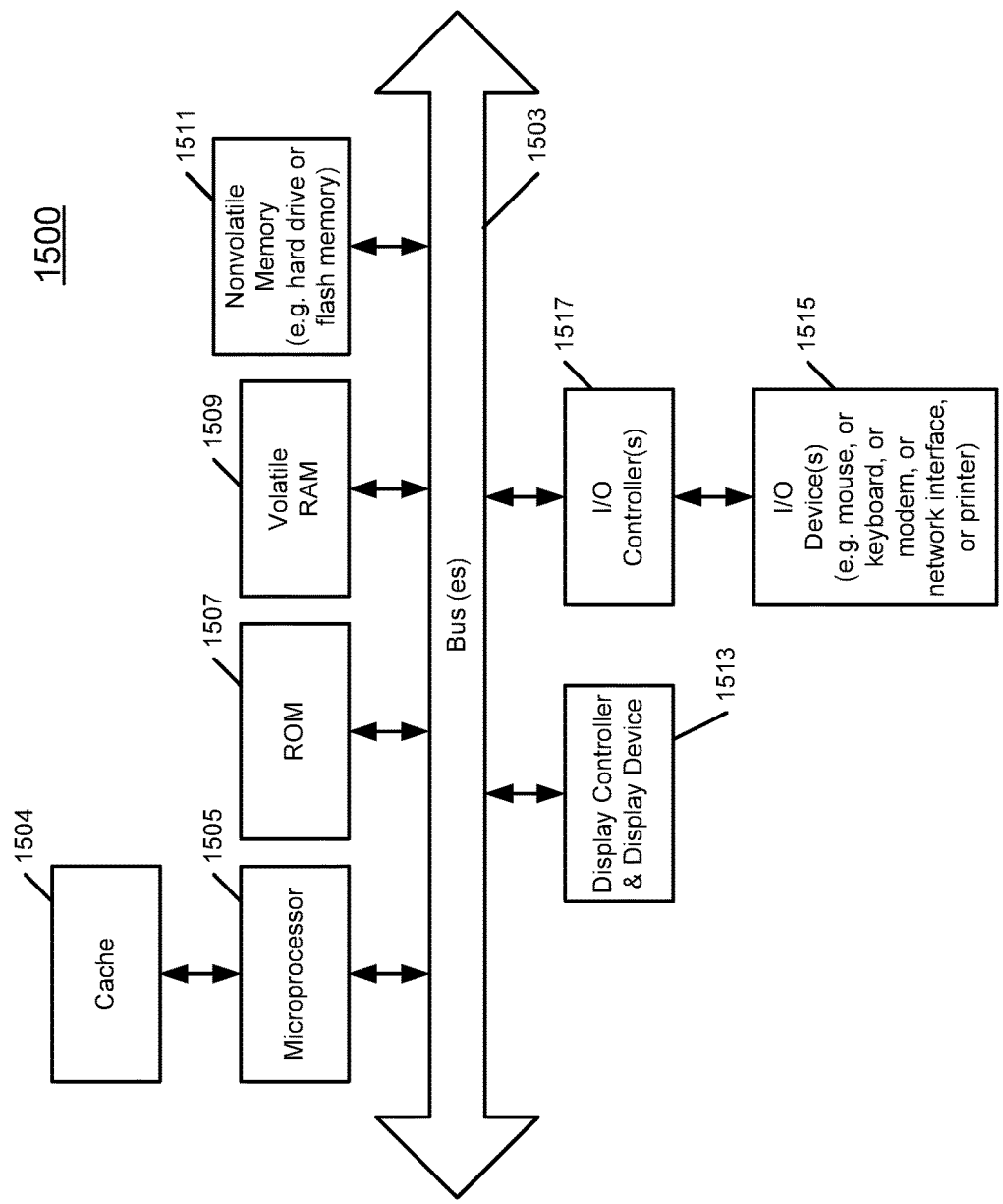
FIG. 15 illustrates one example of a data processing system such as a computer system, which may be used in conjunction with the embodiments described herein.

FIG. 15 shows one example of a data processing system, such as a computer system, which may be used with one embodiment the present invention. For example, the system 1500 may be implemented as a part of the system shown in FIG. 1. Note that while FIG. 15 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 15, the computer system 1500, which is a form of a data processing system, includes a bus 1503 which is coupled to a microprocessor(s) 1505 and a ROM (Read Only Memory) 1507 and volatile RAM 1509 and a non-volatile memory 1511. The microprocessor 1505 may retrieve the instructions from the memories 1507, 1509, 1511 and execute the instructions to perform operations described above. The bus 1503 interconnects these various components together and also interconnects these components 1505, 1507, 1509, and 1511 to a display controller and display device 1513 and to peripheral devices such as input/output (I/O) devices which may be mice, keyboards, modems, network interfaces, printers and other devices which are well known in the art. Typically, the input/output devices 1515 are coupled to the system through input/output controllers 1517. The volatile RAM (Random Access Memory) 1509 is typically implemented as dynamic RAM (DRAM) which requires power continually in order to refresh or maintain the data in the memory.

The mass storage 1511 is typically a magnetic hard drive or a magnetic optical drive or an optical drive or a DVD RAM or a flash memory or other types of memory systems which maintain data (e.g. large amounts of data) even after power is removed from the system. Typically, the mass storage 1511 will also be a random access memory although this is not required. While FIG. 15 shows that the mass storage 1511 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 1503 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable non-transitory storage medium having instructions therein, which when executed by a machine, cause the machine to perform a method, the method comprising:
   tracking activities among a plurality of threads,
      each thread of the plurality of threads associated with one or more of the activities to perform operations for the associated activities, the activities having a priority order, each activity performed by one or more of the threads of the plurality of threads for a data processing task, wherein the plurality of threads belong to a plurality of processes running in one or more processors; identifying a particular activity of the tracked activities, the particular activity having highest priority based on the priority order among the activities;

identifying a group of the threads of the plurality of threads belonging to the plurality of processes associated with the particular activity identified;

selecting a thread from the group of threads of the plurality of threads identified for next scheduled execution in the processors, the selected thread associated with a first process of the plurality of processes, the first process having the priority of the particular identified activity;

executing the selected thread for next execution in the processors, receiving, by a second process in the plurality of processes, a message from the first process to perform operations for the particular identified activity on behalf of the first process, the message including the priority of the first process, setting a priority of a thread of the second process to the priority of the first process, and executing the thread of the second process in the processors.

2. The medium of claim 1, wherein the processes are prioritized via a process priority, wherein the group of threads are running in two or more of the processes, and wherein the selection from the group of threads is based on the process priority of the threads.

3. The medium of claim 1, wherein the activities are identified by activity identifiers and wherein the tracking comprises:

maintaining the activity identifiers in a registry, wherein each activity identifier is associated with a reference count indicating whether a corresponding activity identified by the activity identifier has been completed.

4. The medium of claim 3, wherein the activities include a first activity identified by a first activity identifier of the activity identifiers, the first activity associated with a first reference count in the registry, the maintenance comprises:

in response to a request including the first activity identifier received from the first process, updating the first reference count to indicate an additional reference to the first activity identifier.

5. The medium of claim 4, wherein the message includes the first activity identifier, and wherein the message is based on an inter process communication mechanism.

6. The medium of claim 4, wherein the threads include a first thread associated with the first activity, the first thread belongs to the first process, and wherein the request is sent from the first thread before performing an operation for the first activity.

7. The medium of claim 6, wherein the registry includes associations of the threads and the activity identifiers, the maintenance further comprising:

updating the associations in response to the request, the updated associations in the registry indicating the first thread is associated with the first activity identifier.

8. The medium of claim 4, wherein the request includes a voucher maintained via a voucher system, wherein the voucher specifies the first activity identifier, and wherein the updating comprises:

verifying whether the voucher is valid via the voucher system, wherein the first reference count is not updated if the voucher is not valid and wherein if the voucher is valid, the voucher is created via the voucher system.

9. The medium of claim 8, wherein the group of threads is identified via the associations between the threads and the activity identifiers in the registry.

10. The medium of claim 3, wherein if at least one of the group of threads is runnable without being blocked from execution, the selected thread is among the at least one runnable threads.

11. The medium of claim 10, wherein the selected thread is not runnable waiting for a blocking condition to be satisfied, the selected thread having a first executable code, wherein if one of the threads has already been identified for satisfying the blocking condition, the identified thread having a second executable code, the execution of the selected thread comprising:

executing the second executable code via the selected thread, wherein the first executable code is subsequently executed via the selected thread already running subsequent to the execution of the second executable code.

12. The medium of claim 11, wherein the blocking condition can be satisfied via one of the threads associated with a separate one of the activities, wherein no thread has been identified for satisfying the blocking condition, the execution of the selected thread comprising:

identifying one or more of the threads associated with the separate activity; and executing the one or more threads associated with the separate activity until the blocking condition is satisfied, wherein the selected thread is executed when the blocking condition is satisfied.

13. The medium of claim 12, wherein the separate activity is identified via a separate one of the activity identifiers, the method further comprising:

determining heuristically a dependency of the blocking condition and the separate activity identifier, wherein the dependency indicates that the blocking condition is to be satisfied via at least one thread associated with the separate activity identifier.

14. The medium of claim 13, wherein the blocking condition includes a lock, wherein the blocking condition is satisfied when the lock is released.

15. A computer implemented method comprising:

tracking activities among a plurality of threads, each thread of the plurality of threads associated with one or more of the activities to perform operations for the associated activities, the activities having a priority order, each activity performed by one or more of the threads of the plurality of threads for a data processing task, wherein the plurality of threads belong to a plurality of processes running in one or more processors;

identifying a particular activity of the tracked activities, the particular activity having highest priority based on the priority order among the activities;

identifying a group of the threads of the plurality of threads belonging to the plurality of processes associated with the particular activity identified;

selecting a thread from the group of threads of the plurality of threads identified for next scheduled execution in the processors, the selected thread associated with a first process of the plurality of processes, the first process having the priority of the particular identified activity;

executing the selected thread in the processors, receiving, by a second process in the plurality of processes, a message from the first process to perform operations for the particular identified activity on behalf of the first process, the message including the priority of the first process, setting a priority of a thread of the second process to the priority of the first process, and executing the thread of the second process in the processors.

16. A computer system comprising:

a memory storing instructions;

a processor coupled to the memory to execute the instructions from the memory, the processor being configured to:

tracking activities among a plurality of threads, each thread of the plurality of threads associated with one or more of the activities to perform operations for the associated activities, the activities having a priority order, each activity performed by one or more of the threads of the plurality of threads for a data processing task, wherein the plurality of threads belong to a plurality of processes running in one or more processors, identifying a particular activity of the tracked activities, the particular activity having highest priority based on the priority order among the activities, identifying a group of the threads of the plurality of threads belonging to the plurality of processes associated with the particular activity identified;

selecting a thread from the group of threads of the plurality of threads identified for next scheduled execution in the processors, the selected thread associated with a first process of the plurality of processes, the first process having the priority of the particular identified activity;

executing the selected thread receiving, by a second process in the plurality of processes, a message from the first process to perform operations for the particular identified activity on behalf of the first process, the message including the priority of the first process, setting a priority of a thread of the second process to the priority of the first process, and executing the thread of the second process.

\* \* \* \* \*